(12) United States Patent
Walenty et al.

(10) Patent No.: US 7,237,433 B2
(45) Date of Patent: Jul. 3, 2007

(54) HYBRID TIRE PRESSURE MONITORING SYSTEM

(75) Inventors: Allen J. Walenty, Macomb, MI (US); John G Maxgay, Rochester Hills, MI (US); Robert A Rimkus, Macomb, MI (US)

(73) Assignee: General Motors Corporation, Detroit, MI (US)

(*) Notice: Subject to any disclaimer, the term of this patent is extended or adjusted under 35 U.S.C. 154(b) by 180 days.

(21) Appl. No.: 11/053,989

(22) Filed: Feb. 9, 2005

(65) Prior Publication Data

US 2005/0139000 A1 Jun. 30, 2005

Related U.S. Application Data

(63) Continuation-in-part of application No. 10/704,369, filed on Nov. 7, 2003, now Pat. No. 6,877,371.

(51) Int. Cl.
*B60C 23/02* (2006.01)
(52) U.S. Cl. ..................... 73/146.5; 340/447
(58) Field of Classification Search .................. 73/146, 73/146.2, 146.3, 146.4, 146.5, 146.6, 146.8; 340/447, 442, 445
See application file for complete search history.

(56) References Cited

U.S. PATENT DOCUMENTS

| | | | |
|---|---|---|---|
| 3,588,815 A | 6/1971 | Koonce | |
| 3,803,550 A | 4/1974 | Mirsky | |
| 4,163,208 A | 7/1979 | Merz | |
| 4,286,253 A | 8/1981 | Nagy | |
| 4,694,273 A | 9/1987 | Franchino | |
| 4,897,630 A | 1/1990 | Nykerk | |
| 5,109,213 A | 4/1992 | Williams | |
| 5,285,189 A | 2/1994 | Nowicki et al. | |
| 5,289,369 A | 2/1994 | Hirshberg | |
| 5,463,374 A | 10/1995 | Mendez et al. | |
| 5,500,637 A | 3/1996 | Kokubu | |
| 5,731,754 A * | 3/1998 | Lee, Jr. et al. | 340/447 |
| 6,973,824 B2 * | 12/2005 | Giustino et al. | 73/146 |
| 2003/0010107 A1 * | 1/2003 | Giustino et al. | 73/146 |

* cited by examiner

*Primary Examiner*—Andre J. Allen
(74) *Attorney, Agent, or Firm*—Lionel D. Anderson

(57) ABSTRACT

A tire pressure monitoring system for a vehicle having a plurality of inflatable tires includes a plurality of rotation sensors that generate rotation signals based on a rotation of each of the tires and a pressure sensor that is responsive to a pressure within one of the tires and that generates a pressure signal based on the pressure. A control module receives the pulse signals and the pressure signal and that detects a low pressure condition of at least one of the tires based on the pressure signal and the pulse signals.

62 Claims, 13 Drawing Sheets

HYBRID TIRE PRESSURE MONITORING SYSTEM

CROSS-REFERENCE TO RELATED APPLICATIONS

This application is a continuation-in-part of U.S. patent application Ser. No. 10/704,369 filed on Nov. 7, 2003, now U.S. Pat. No. 6,877,371. The disclosure of the above application is incorporated herein by reference.

FIELD OF THE INVENTION

The present invention relates to vehicles, and more particularly to a tire pressure monitoring system for vehicle.

BACKGROUND OF THE INVENTION

A vehicle powertrain generates and transfers drive torque to drive at least one of a plurality of tires of the vehicle. The tires should be inflated to a predetermined (i.e., placard) pressure in order to prevent irregular tire wear and to ensure acceptable vehicle performance. Tire pressure monitoring systems have been developed to monitor the inflation level of the tires to inform a vehicle operator if a low pressure condition exists.

Traditional tire pressure monitoring systems include tire pressure sensors in each tire or use tire speed to monitor proper inflation pressure of the tires. Tire pressure sensors add undesired cost and complexity to the vehicle. Speed-based tire pressure monitoring systems measure the time between speed ring teeth on a target tire such as an ABS ring. The time is used to calculate tire speed and tire slip. Due to the nature of these calculations, traditional systems are prone to noisy data as a result of imprecise machining of speed ring teeth and micro-processor timing limitations. Although traditional tire speed based systems may operate well while traveling in a straight line, at a steady speed and on a smooth surface, they exhibit a high rate of false warnings when conditions are not optimal.

SUMMARY OF THE INVENTION

Accordingly, the present invention provides a tire pressure monitoring system for a vehicle having a plurality of inflatable tires. The tire pressure monitoring system includes a plurality of rotation sensors that generate rotation signals based on a rotation of each of the tires and a pressure sensor that is responsive to a pressure within one of the tires and that generates a pressure signal based on the pressure. A control module receives the rotation signals and the pressure signal and detects a low pressure condition of at least one of the tires based on the pressure signal and the pulse signals.

In other features, the control module characterizes a tire pressure monitoring baseline based on the pulse signals and the pressure signal. The control module detects a low pressure condition of at least one of the tires based on the baseline and the pulse signals. The control module characterizes the baseline when the pressure signal indicates a pressure change that exceeds a threshold pressure change within a threshold time.

In another feature, the control module detects the low pressure condition of at least one of the tires based on the pressure signal.

In other features, the rotational sensors include pulse generating sensors, wherein the rotation signals include pulse signals. The control module accumulates individual pulse sums from each of the pulse generating sensors and generates a record of a sum of total pulses. The control module detects the low pressure condition based on the record. The control module compares the record to a previous record to determine whether the record is valid. The control module determines a pulse ratio for each of the tires based on the pulse signals and the low pressure condition is detected based on the pulse ratios.

In still other features, the control module determines a first distance one of the tires has traveled based on the rotation signal associated with the one of the tires and determines a second distance another of the tires has traveled based on the rotation signal associated with the another of the tires. The control module detects the low pressure condition based on the first distance and the second distance. The first and second distances each comprise a distance record that is compared to a criteria to determine whether the distance record is valid.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As used herein, the term placard pressure is the vehicle manufacturer's recommended cold tire pressure. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

The hybrid tire pressure monitoring (hTPM) system of the present invention combines a direct TPM with an indirect TPM (iTPM) system to enable detection of four tires that are similarly and simultaneously at low pressure. The iTPM system is disclosed in co-pending U.S. patent application Ser. No. 10/704,369, filed Nov. 3, 2003, the disclosure of which is expressly incorporated herein by reference. The iTPM system uses wheel speed data to determine low pressure conditions through measurement of the rolling radius of any single tire, any two tires, or any three tires. As discussed in further detail below, the hTPM system integrates a pressure sensor or direct TPM (dTPM) into the iTPM system to improve the functionality of the indirect portion of the hybrid system.

Figure 1:
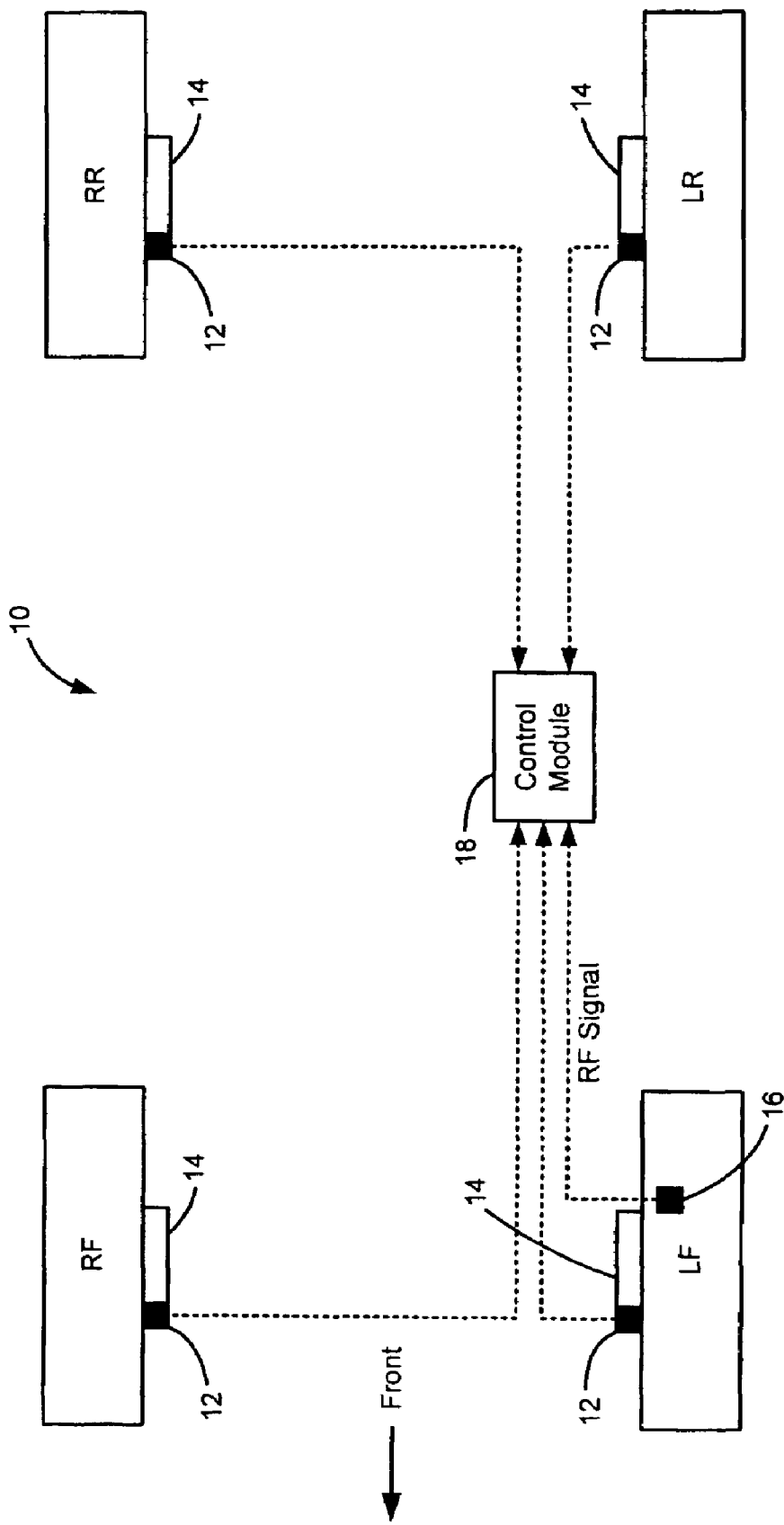
FIG. 1 is a schematic illustration of a vehicle incorporating a hybrid tire pressure monitoring (hTPM) system according to the present invention.

Referring now to FIG. 1, an exemplary vehicle 10 is illustrated and includes a plurality of inflatable tires RF, LF, RR and RL. Tire rotation sensors 12 are associated with each tire to sense all four tire rotations. It is anticipated that the wheel rotation sensors 12 can be part of an anti-lock braking (ABS) system, however, an ABS system is not required as signals generated by the wheel rotation sensors can be processed by other systems including other vehicle control modules, as discussed in further detail below. The wheel rotation sensors 12 are preferably provided as digital pulse sensors that generate a predetermined number of pulses for each revolution of the associated tire. More specifically, an integrated machined tooth on a target wheel 14 passes a tire rotation sensor 12 generating a rising edge digital pulse upon first contact and a falling edge digital pulse when the tooth is no longer within the sensor's proximity. The digital pulse devices that may be used include, but are not limited to, optical encoders, inductive wheel speed sensor, variable reluctance sensors, magneto-resistive sensors, and Hall effect sensors.

At least one tire pressure sensor 16 is associated with at least one of the tires. Although a single tire pressure sensor is illustrated, it can be appreciated that additional tire pressure sensors can be implemented. The tire pressure sensor 16 generates a pressure signal. The pressure signal can be wirelessly communicated to a control module, as discussed in further detail below. The tire pressure sensor 16 is used to verify proper inflation of at least one tire before steady state operation of the hTPM system of the present invention.

A control module 18 processes the various sensor signals in accordance with the hTPM system of the present invention. More specifically, the tire rotation signals and the pressure signal are communicated to the control module 18. The control module 18 can be one of various vehicle control modules associated with the vehicle 10 including, but not limited to, an ABS system control module, an engine control module (ECM), a body control module (BCM) and a powertrain control module (PCM). More generally, the control module 18 can include any electronic module on the vehicle capable of receiving wireless data such as a radio or remote keyless entry (RKE) transceiver. The hTPM system can be executed by multiple control modules (e.g., RKE module and BCM) or alternatively in a single control module (e.g., BCM while power is enabled). Using multiple control modules, a first control module (e.g., RKE module) tracks tire cool-down and determines when a tire pressure increase occurs over a target time limit. A second control module (e.g., the BCM) monitors heating and cooling, determines when to reset tire characterization, discussed in detail below, and provides a handshake back to the first control module upon reception of the pressure increase flag.

The dTPM portion of the hTPM system uses the tire pressure signal to ensure that at least one tire is at the correct pressure and may be used as a reference for the remaining tires. The iTPM portion of the hTPM system is based on the distance traveled, or on the measured distance traveled by each tire. The quantity of machined teeth and rolling circumference of each target determines the relationship between signal pulses and distance. A less inflated tire has a smaller rolling radius than a more inflated tire and an under-inflated tire will rotate a different distance per each full rotation than a properly inflated tire. The iTPM portion is disclosed and discussed in further detail in co-pending parent U.S. patent application Ser. No. 10/704,369.

The hTPM system operates using a characterization or baseline of digital pulse information, which is used to determine whether a tire is over or under pressure. More specifically, ratios are determined for a plurality of tires, as described in further detail below. The ratios are compared to threshold to determine whether a tire is over or under pressure. Primary and secondary characterization routines are provided to establish a baseline for accurately determining the ratios. More specifically, the primary characterization routine is an initial routine that is completed within a relatively short period of time (e.g., 20 minutes). The secondary characterization routine occurs over an extended period of time (e.g., hours or days) to fine-tune the baseline. The primary and secondary characterization routines can be automatically triggered when the pressure sensor signal increases or decreases a threshold amount (e.g., 3 PSI) within a threshold time period (e.g., 4 minutes). Such a situation may occur as a result of a tire fill event. Alternatively, the primary characterization routine can be automatically initiated by certain predetermined activating conditions such as a production line process, the removal of a spare tire, when a low tire alert is cleared during normal operation or during a secondary characterization, but is not limited to such. The primary characterization routine can be manually initiated by depressing a button or some other input mechanism.

Figure 2A:
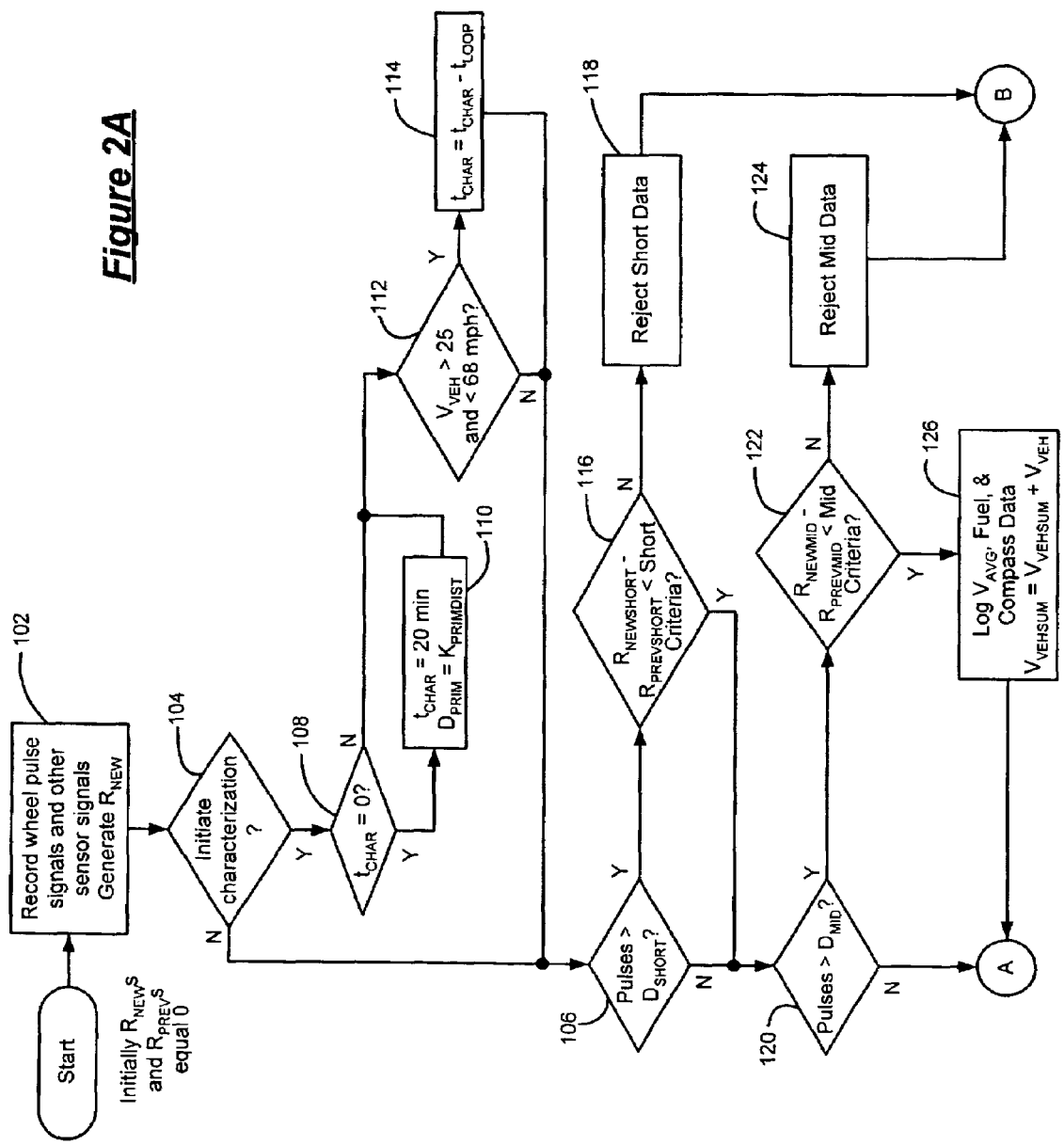
FIGS. 2A and 2B are flowcharts illustrating primary characterization steps performed by the hTPM system.
Figure 2B:
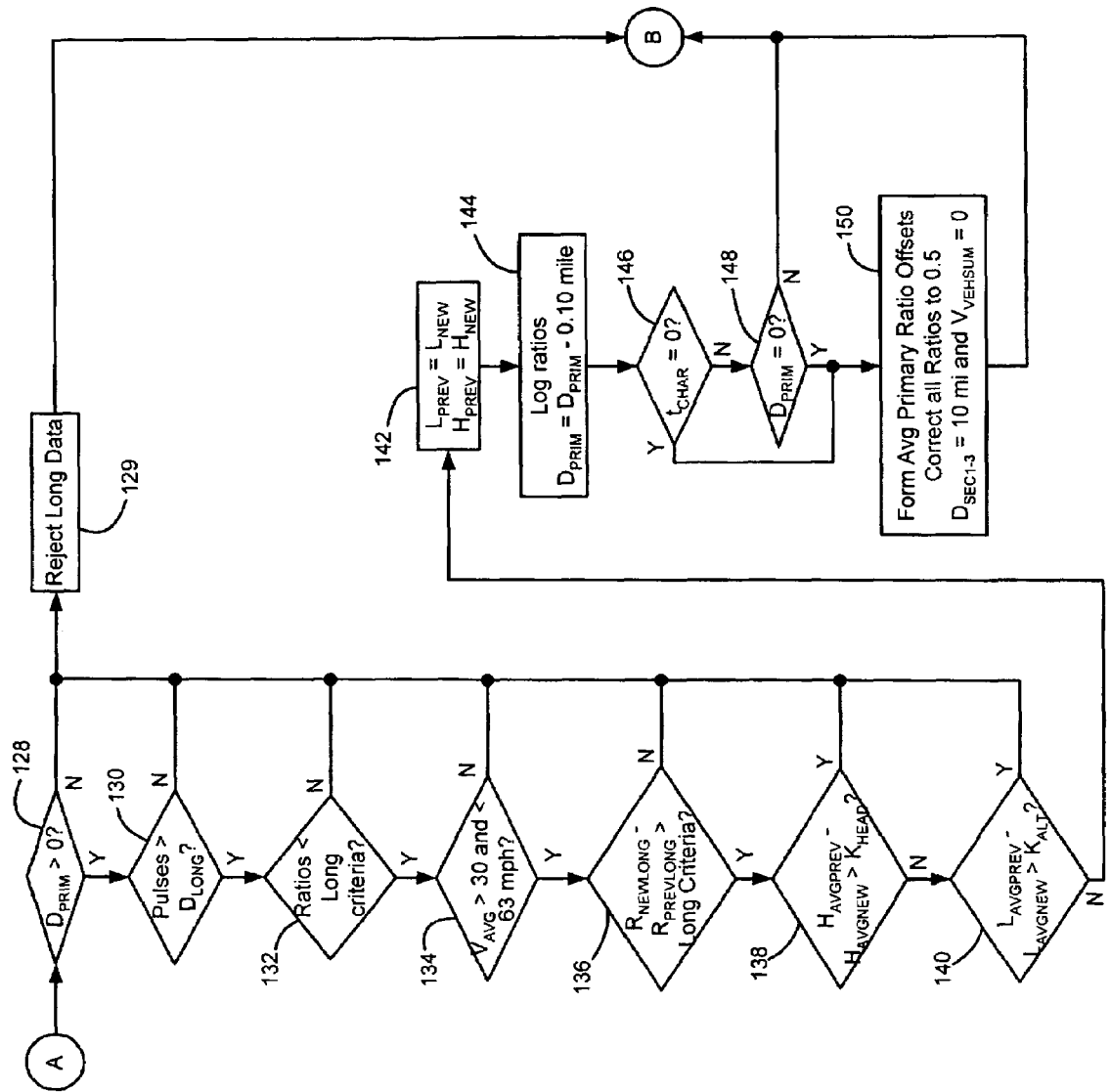

Referring now to FIGS. 2A and 2B, the primary characterization routine executed by the hTPM system will be described in detail. Prior to executing the primary characterization routine, an operator has preferably verified the proper inflation of the tires. Further all previous ratios ($R_{PREV}$) and all new ratios ($R_{NEW}$), discussed in further detail below, are set equal to zero. Control determines whether the collected digital pulse data is suitable for determining tire pressure imbalance. More specifically, a series of checks are performed to determine whether the vehicle is stable. Typical stability criteria include, but are not limited to, acceleration below a threshold, wheel slip and grip below a threshold, turning radius above a limit, repeatability of ratios and other similar criteria. If the stability criteria are not met, control does not execute the primary characterization routine.

If the stability criteria are met, control records a record from the digital pulse sensors 12 and records data from other sensors in step 102. A record is preferably a pulse count from the digital pulses sensors 12. The record includes, but is not limited to, a total pulse count from all the digital pulse sensors 12, individual pulse counts from each digital pulse sensor 12 and/or a ratio of pulse counts from the digital pulse sensors 12. Any mathematical manipulation of the digital pulses from the digital pulse sensors 12 may also be considered a record. The other sensors include, but are not limited to, a fuel level sensor and an electronic compass. Previous ratios ($R_{PREV}$) are set equal to new ratios ($R_{NEW}$) when the new records and ratios are generated.

In step 104, control determines whether a characterization switch has been activated to start the characterization process. The characterization switch can be activated manually or automatically, as described in further detail below. If the characterization switch is not on, then the method will continue to the pulse counting portion of the method at block 106. If the characterization switch is not on and an automatic trigger has not occurred, then the control continues in step 106. If the characterization switch is on or an automatic trigger has occurred, then the primary characterization routine begins in step 108.

In step 108, control determines whether a primary characterization time ($t_{CHAR}$) is equal to zero. Zero indicates that the primary characterization has been completed. If $t_{CHAR}$ is equal to zero, control continues in step 110. If $t_{CHAR}$ is not equal to zero, control continues in step 112. In step 110, $t_{CHAR}$ is set to twenty minutes and a primary distance ($D_{PRIM}$) is set to a calibration value ($K_{PRMDIST}$) (e.g., 2 miles). $D_{PRIM}$ is the distance over which the primary characterization occurs. In step 112, control determines whether a vehicle speed ($V_{VEH}$) is within a certain speed band (e.g., greater than 25 mph and less than 68 mph).

$V_{VEH}$ is monitored during primary characterization while records are collected to compensate for the centrifugal force acting on the tires. Most commercially available tires deform relative to the centrifugal force applied, which is a function of rotational speed. Any speed band may be used where relatively repeatable and stable digital pulse information is collected. For example, for a speed band of 31–62 mph, if five records are taken at 55, 63, 63, 64 and 63 mph, only one record will have been recorded. The records can be averaged to determine if they fall within the speed band. When averaged, the five exemplary records have an average speed of 61.5 mph which falls within the exemplary speed band. If $V_{VEH}$ is within the speed band, control continues in step 114. If $V_{VEH}$ is not within the speed band, control continues in step 106. In step 114, control sets $t_{CHAR}$ equal to $t_{CHAR}$ minus a loop time ($t_{LOOP}$). $t_{LOOP}$ is the time required to execute a program loop. $t_{CHAR}$ is decremented by $t_{LOOP}$ whenever a valid record is taken within the speed band.

In step 106, control processes the total number of digital pulses (Pulses) or records to determine if the distance traveled is greater than a short distance threshold ($D_{SHORT}$) (e.g., approximately 6 feet). As discussed above, the record can include a set of pulses/counts preferably equal to a certain distance, but any number of counts or distance is within the scope of the present invention. The record can alternatively include a ratio of counts/pulses including, but not limited to, the diagonal, front and left side ratios, discussed in further detail below. If Pulses indicate that the total distance traveled is greater than $D_{SHORT}$, control continues in step 116. If Pulses indicate that the total distance traveled is less than $D_{SHORT}$, control continues in step 120.

In step 116, the previous short ratio for each tire ($R_{PREVSHORT}$) are subtracted from the new short ratio for each tire ($R_{NEWSHORT}$) to determine whether the difference is less than a short distance criteria threshold (Short Criteria). The ratios ($R_{PREVSHORT}$, $R_{NEWSHORT}$) are calculated as the ratio of the individual pulse sums of each tire over the distance traveled. Short Criteria is used to ensure that the new records are substantially consistent with the previous records. If the difference is not less than the Short Criteria, the newly collected record is rejected in step 118 and control continues in step 200 of FIG. 3A. If the difference is less than the Short Criteria, control continues in step 120.

In step 120, control processes the total number of digital pulses (Pulses) or records to determine if the distance traveled is greater than a mid-distance threshold ($D_{MID}$) (e.g., approximately 88 feet). If Pulses indicate that the total distance traveled is greater than $D_{MID}$, control continues in step 122. If Pulses indicate that the total distance traveled is not greater than $D_{MID}$, control continues in step 128 of FIG. 2B.

In step 122, the previous mid ratio for each tire ($R_{PREVMID}$) are subtracted from the new mid ratio for each tire ($R_{NEWMID}$) to determine whether the differences are less than a mid distance criteria threshold (Mid Criteria). The ratios ($R_{PREVMID}$, $R_{NEWMID}$) are calculated as the ratio of the individual pulse sums of each tire over the distance traveled. Mid Criteria is used to ensure that the new records are substantially consistent with the old records. If the difference is not less than the Mid Criteria, the newly collected record is rejected in step 124 and control continues in step 200 of FIG. 3A. If the difference is less than the Mid Criteria, control records the average speed, compass heading and fuel level data in step 126. The average speed is determined by summing the vehicle speed at which a successful mid distance record is collected and then dividing the sum ($V_{VEHSUM}$) by the number of successful passes through the mid criteria routine. Control continues in step 128 of FIG. 2B.

Figure 3A:
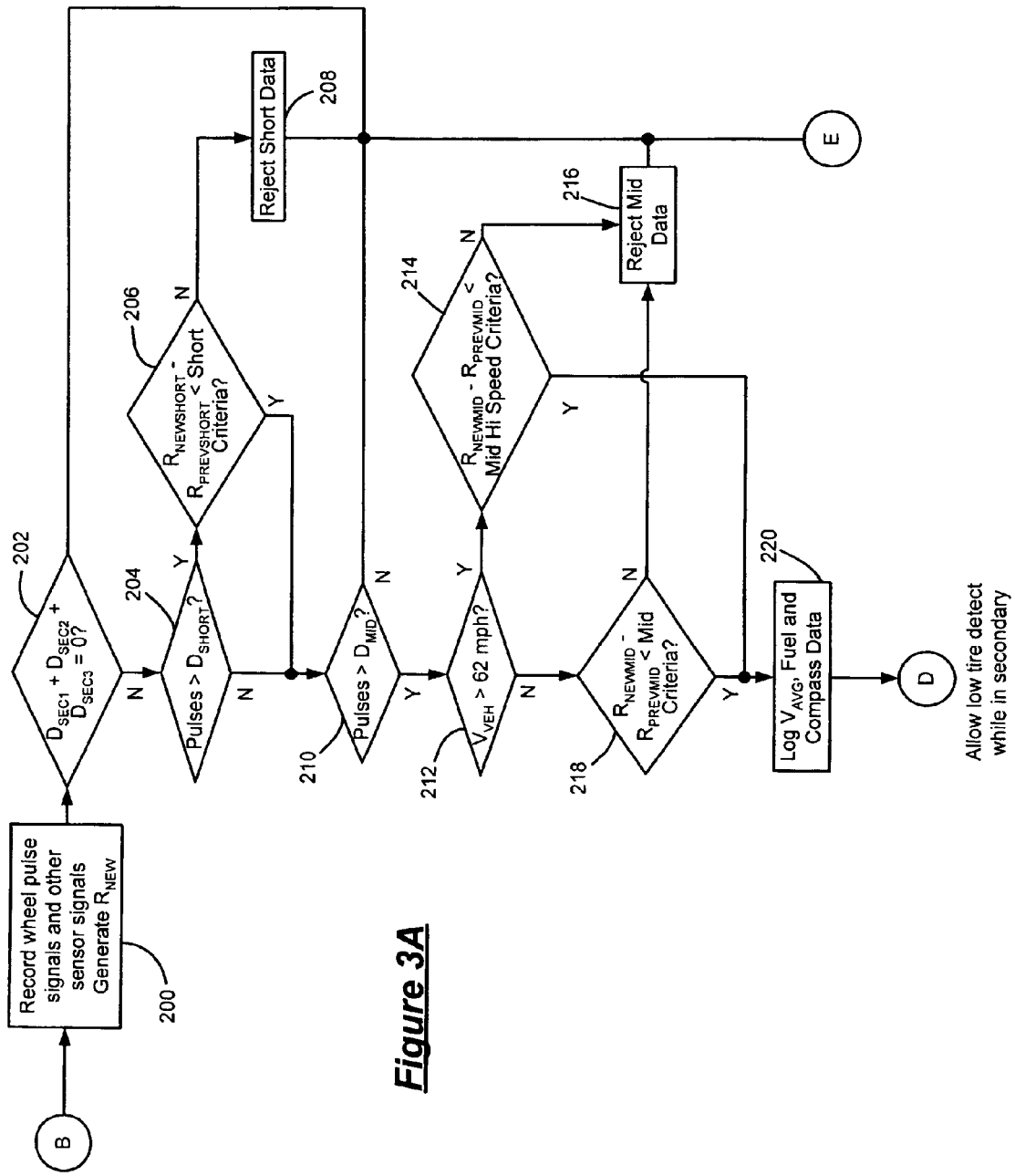
FIGS. 3A and 3B are flowcharts illustrating secondary characterization steps performed by the hTPM system.

With particular reference to FIG. 2B, control determines whether the $D_{PRIM}$ is greater than zero in step 128. In this manner, control determines if the primary characterization is complete. If $D_{PRIM}$ is not greater than zero, control rejects the long distance data in step 129 and continues to the secondary characterization routine as illustrated in FIG. 3A. If $D_{PRIM}$ is greater than zero, control processes the total number of digital pulses (Pulses) or records to determine whether the distance traveled is greater than a long distance threshold ($D_{LONG}$) (e.g., approximately 528 feet or $\frac{1}{10}^{th}$ of a mile). If Pulses indicate that the distance traveled is greater than $D_{LONG}$, control continues in step 132. If Pulses indicate that the distance traveled is not greater than $D_{LONG}$, control rejects the long distance data in step 129 and continues to the secondary characterization routine in step 200 of FIG. 3A.

In step 132, control determines whether the difference between the new long ratio for each tire ($R_{NEWLONG}$) and the previous long ratios for each tire ($R_{PREVLONG}$) is less than a long distance criteria threshold (Long Criteria). If the difference is less than Long Criteria, control continues in step 134. If the difference is not less than Long Criteria, control rejects the long distance data in step 129 and continues to the secondary characterization routine in step 200 of FIG. 3A. In step 134, control determines whether the records have been collected within a speed band (e.g, between 31 mph and 62 mph) by determining whether an average vehicle speed ($V_{AVG}$) is within the speed band. If the records have not been collected within the speed band, control rejects the long distance data in step 129 and continues to the secondary characterization routine as illustrated in FIG. 3A. If the records have been collected within the speed band, control continues in step 136.

In step 136, the previous long ratio for each tire ($R_{PREVLONG}$) are subtracted from the new long ratio for each tire ($R_{NEWLONG}$) to determine whether the differences are less than Long Criteria. Long Criteria is used to ensure that the new records are substantially consistent with the old records. The ratios are calculated as the ratio of the individual pulse sums of each tire over the Long Distance traveled. If the differences are less than Long Criteria, control continues in step 138. If the differences are not less than Long Criteria, control rejects the long distance data in step 129 and continues to the secondary characterization routine as illustrated in FIG. 3A.

In step 138, control processes an average new electronic compass heading ($H_{AVGNEW}$) and an average previous electronic compass heading ($H_{AVGPREV}$) to determine whether the vehicle is traveling on a long curve where the tire records are effected. A constant $K_{HEAD}$ is used determine whether the heading indicates an invalid record. If the difference between $H_{AVGPREV}$ and $H_{AVGNEW}$ is greater than $K_{HEAD}$, control rejects the long distance data in step 129 and continues to the secondary characterization routine as illustrated in FIG. 3A. If the difference is not greater than $K_{HEAD}$, control continues in step 140. In step 140, control determines whether a fuel level has changed above a calibration ($K_{ALT}$), which indicates that the vehicle is on a grade where a collected record may be invalid. More specifically, control determines whether the difference between an average previous fuel level ($L_{AVGPREV}$) and an average new fuel level ($L_{AVGNEW}$) is greater than $K_{ALT}$. If the fuel level has changed above $K_{ALT}$, control rejects the long distance data in step 129 and continues to the secondary characterization routine as illustrated in FIG. 3A. If the fuel level has changed above $K_{ALT}$, control continues in step 142.

In step 142, control sets the previous fuel level ($L_{PREV}$) and previous compass heading ($H_{PREV}$), respectively equal to the new fuel level ($L_{NEW}$) and new compass heading ($H_{NEW}$) for the next record. In step 144, control records the accepted records and ratios into the memory. The number of records stored may be any number of records to comply with government regulations and the processing requirements of the hTPM system. Also, $D_{PRIM}$ is decremented by a tenth of a mile in step 144. In step 146, control determines whether $t_{CHAR}$ is equal to zero. If $t_{CHAR}$ is equal to zero, control continues in step 150. If $t_{CHAR}$ is not equal to zero, control determines whether $D_{PRIM}$ is equal to zero in step 148. If $D_{PRIM}$ is equal to zero, control continues in step 150. If $D_{PRIM}$ is not equal to zero control continues to the secondary characterization routine as illustrated in FIG. 3A.

In step 150, control generates average primary ratio offsets and the $V_{VEHSUM}$ is set equal to zero. The average primary ratios are calculated by dividing all summed ratios by the number of successful ratios that were collected during the primary characterization. All ratios are corrected to one half (i.e., 0.5) and the secondary distances/odometers ($D_{SEC1}$, $D_{SEC2}$ and $D_{SEC3}$) are preferably set to 8, 16, and 32, miles respectively. The ratio offsets are calculated by subtracting the average ratios from 0.5. A diagonal ratio offset is equal to 0.5 minus the average diagonal ratio. The secondary characterization distances are the distances used in the secondary characterization routine.

Figure 3B:
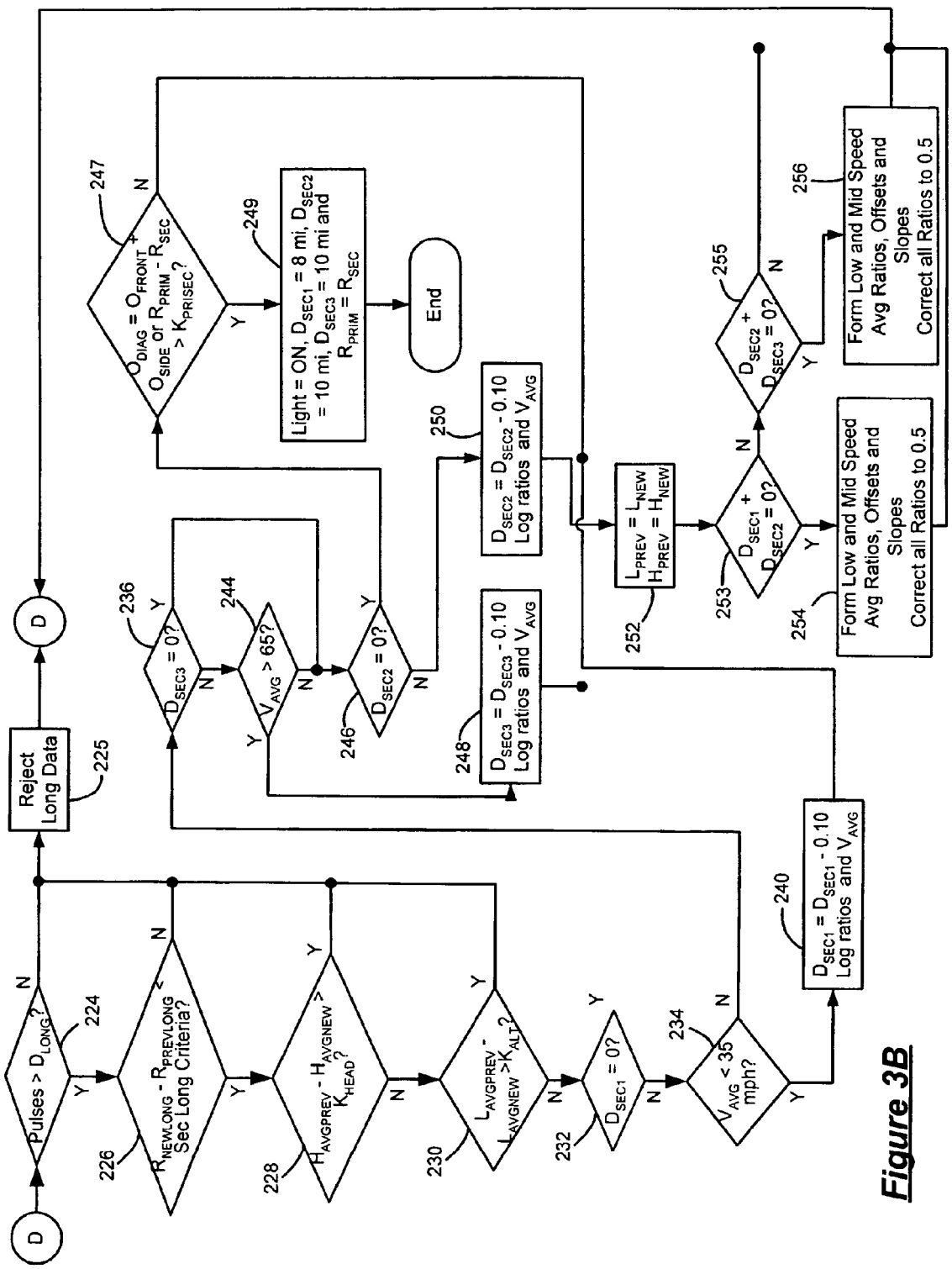

Referring now to FIGS. 3A and 3B, the secondary characterization routine executed by the hTPM system will be described in detail. The secondary characterization collects data at all speed ranges and sums the data in a corresponding speed range data bank. Further, the secondary characterization updates the individual speed range specific odometer, such as a calibratable distance (e.g., 8 miles for low speed, 16 miles for mid speed, and 32 miles for high speed) and sums the average vehicle speed of each record in that speed range. For example, if three records are taken at 65, 75, and 85 mph, the average speed of this speed band is 75 mph.

When the primary characterization is finished low tire detection is operational within the characterized speed band (e.g., 31–62 mph or 50–100 kph). When the secondary characterization characterizes the low and mid speed bands or the mid and high speed bands, low tire detection is operational only in those two speed bands. The third speed band will preferably become operational only upon completion. Upon completion of the secondary characterization, the secondary characterization is used to determine tire pressure faults. However, if the difference between the mid speed ratios generated by the primary characterization and those generated by the secondary characterization are not repeatable, the low tire telltale may be illuminated, informing the driver that a slow leak or other tire problem exists. One way to determine whether a tire problem exists is to examine the low tire detection odometers. When any detection odometer is not equal to zero it means that a low tire condition existed but the odometer did not reach the adaptive detection activation distance. Another way to determine whether a tire problem exists is when the difference between the primary and secondary mid speed ratios exceed a threshold ($K_{PRIMSEC}$). This calibration represents a specific change in revolutions per kilometer (RPK) that is at or near the low tire pressure detection threshold. The tire pressures should be checked and the secondary characterization may be automatically repeated to allow a change in RPK that occurs in certain rare tires during a break-in period.

In step 200, control collects records from the digital pulse sensors 12. As discussed above, a record is preferably a pulse count or some mathematical transformation of the pulse counts from the digital pulses sensors 12. The record may comprise a total pulse count from all the digital pulse sensors 9, 10, 11, and 12, individual pulse counts for each tire and/or a ratio of pulse counts. When using multiple control modules, the digital pulse count can be processed by the ABS system and transferred to the BCM 14. In step 202, control determines whether the sum of multiple secondary distance values ($D_{SEC1}$, $D_{SEC2}$ and $D_{SEC3}$) are equal to zero. In this manner, control determines whether secondary characterization is complete. If the sum is equal to zero, control continues in step 300 of FIG. 4A. If the sum is not equal to zero, control continues in step 204.

In step 204, control processes the total number of digital pulses (Pulses) or records to determine if the distance traveled is greater than $D_{SHORT}$ (e.g., approximately 6 feet). As discussed above, the record can include a set of pulses/counts preferably equal to a certain distance, but any number of counts or distance is within the scope of the present invention. The record can alternatively include a ratio of counts/pulses including, but not limited to, the diagonal, front and left side ratios. If Pulses indicate that the total distance traveled is greater than $D_{SHORT}$, control continues in step 206. If Pulses indicate that the total distance traveled is less than $D_{SHORT}$, control continues in step 210.

In step 206, the previous short ratios for each tire ($R_{PREVSHORT}$) are subtracted from the new short ratios for each tire ($R_{NEWSHORT}$) to determine whether the difference is less than Short Criteria. The ratios ($R_{PREVSHORT}$, $R_{NEWSHORT}$) are calculated as the ratio of the individual pulse sums of each tire over the distance traveled. Short Criteria is used to ensure that the new records are substantially consistent with the previous records. If the new ratios do not meet the Short Criteria, then the newly collected record is rejected in step 208 and control continues in step 300 of FIG. 4A. If the new ratios do meet the Short Criteria, then control continues in step 210.

In step 210, control processes the total number of digital pulses (Pulses) or records to determine if the distance traveled is greater than $D_{MID}$ (e.g., approximately 88 feet). If Pulses indicate that the total distance traveled is greater than $D_{MID}$, control continues in step 212. If Pulses indicate that the total distance traveled is not greater than Mid Distance, control continues in step 300 of FIG. 4A. In step 212, control determines whether $V_{VEH}$ is greater than a high speed threshold (e.g., 62 mph). If $V_{VEH}$ is greater than the high speed threshold, control continues in step 214. If $V_{VEH}$ is not greater than the high speed threshold, control continues in step 218.

In step 214, the previous mid ratio for each tire ($R_{PREVMID}$) are subtracted from the new mid ratio for each tire ($R_{NEWMID}$) to determine whether the differences are less than a mid distance, high speed criteria threshold (Mid HI Speed Criteria). The ratios ($R_{PREVMID}$, $R_{NEWMID}$) are calculated as the ratio of the individual pulse sums of each tire over the distance traveled. Mid HI Speed Criteria is used to ensure that the new records are substantially consistent with the old records. If the new ratios do not meet the Mid HI Speed Criteria, the newly collected record is rejected in step 216 and control continues in step 300 of FIG. 4A. If the new ratios meet the Mid HI Speed Criteria, control continues in step 220.

In step 218, the previous mid ratio for each tire ($R_{PREVMID}$) are subtracted from the new mid ratio for each tire ($R_{NEWMID}$) to determine whether the differences are less than a mid distance criteria threshold (Mid Criteria). The ratios ($R_{PREVMID}$, $R_{NEWMID}$) are calculated as the ratio of the individual pulse sums of each tire over the Mid Distance traveled. Mid Criteria is used to ensure that the new records are substantially consistent with the old records. If the new ratios do not meet the Mid Criteria, the newly collected record is rejected in step 216 and control continues in step 300 of FIG. 4A. If the new ratios meet the Mid Criteria, control continues in step 220. In step 220, control records the pulse counts, average speed, fuel and compass data for the mid distance in the secondary characterization.

Referring now to FIG. 3B, control processes the total number of digital pulses (Pulses) or records to determine whether the distance traveled is greater than $D_{LONG}$ (e.g., approximately 528 feet or $\frac{1}{10}^{th}$ of a mile) in step 224. If Pulses indicate that the distance traveled is greater than $D_{LONG}$, control continues in step 226. If Pulses indicate that the distance traveled is not greater than $D_{LONG}$, control rejects the long distance data in step 225 and continues in step 300 of FIG. 4A. In step 226, control determines whether the difference between the new long ratio for each tire ($R_{NEWLONG}$) and the previous long ratio for each tire ($R_{PREVLONG}$) is less than a secondary long distance criteria threshold (Sec Long Criteria). If the difference is less than Sec Long Criteria, control continues in step 228. If the difference is not less than Sec Long Criteria, control rejects the long distance data in step 225 and continues in step 300 of FIG. 4A.

In step 228, control processes an average new electronic compass heading ($H_{NEW}$) and an average previous electronic compass heading ($H_{PREV}$) to determine whether the vehicle is traveling on a long curve where the tire records are effected. A constant $K_{HEAD}$ is used determine whether the heading indicates an invalid record. If the difference between $H_{PREV}$ and $H_{NEW}$ is greater than $K_{HEAD}$, control rejects the long distance data in step 225 and continues in step 300 of FIG. 4A. If the difference between $H_{PREV}$ and $H_{NEW}$ is not greater than $K_{HEAD}$, control continues in step 230. In step 230, control determines whether a fuel level has changed above a calibration ($K_{ALT}$), as similarly described above. If the fuel level has changed above $K_{ALT}$, control rejects the long distance data in step 225 and continues in step 300 of FIG. 4A. If the fuel level has not changed above $K_{ALT}$, control continues in step 232.

In step 232, control determines whether the vehicle has traveled a distance greater than $D_{SEC1}$. More specifically, $D_{SEC1}$ is a distance timer upon expiration of which, secondary data collection in the low speed band is ended. If $D_{SEC1}$ is equal to zero, control continues in step 236. If $D_{SEC1}$ is not equal to zero, control continues in step 234. In step 234, control determines whether an average vehicle speed ($V_{AVG}$) is less than a threshold (e.g., 35 mph). If $V_{AVG}$ is not less than the threshold, control continues in step 236. If $V_{AVG}$ is less than the threshold, control continues in step 240. In step 240, control decrements $D_{SEC1}$ by a tenth of a mile, the records and ratios are logged, the average speed is recorded and control continues in step 252.

In step 236, control determines whether $D_{SEC3}$ is equal to zero, which indicates that the record collecting at $D_{SEC3}$ has been completed. $D_{SEC3}$ is the distance timer used to end secondary data collection in the high speed band. If $D_{SEC3}$ is equal to zero, control continues in step 246. If $D_{SEC3}$ is not equal to zero, control continues in step 244. In step 244, control determines whether $V_{AVG}$ is greater than a threshold (e.g., 65 mph). If $V_{AVG}$ is not greater than the threshold, control continues in step 246. If $V_{AVG}$ is greater than the threshold, control continues in step 248. In step 248, control decrements $D_{SEC3}$ a tenth of a mile logs the records and ratios and control continues in step 252.

In step 246, control determines whether $D_{SEC2}$ is equal to zero. $D_{SEC2}$ is the distance timer used to end secondary data collection in the mid speed band. If $D_{SEC2}$ is not equal to zero, control continues in step 250. If $D_{SEC2}$ is equal to zero, control continues in step 247. In step 250, control decrements $D_{SEC2}$ a tenth of a mile, logs the records and ratios and control continues in step 252.

In step 247, control determines whether the sum of $O_{DIAG}$, $O_{FRONT}$ and $O_{SIDE}$ are not equal to zero or if the difference between the primary mid speed ratios ($R_{PRIMMID}$) and the secondary mid speed ratios ($R_{SECMID}$) exceeds a calibration ($K_{PRIMSEC}$). In this manner, control ensures that the ratios are not too far apart and are repeatable. If the sum is equal to zero and the difference is less than $K_{PRIMSEC}$, control continues in step 249. If the sum is not equal to zero and the difference is less than $K_{PRIMSEC}$, control continues in step 252. In step 249, control illuminates the low tire telltale, starts automatic re-characterization of certain rare tires that change RPK during a break-in period, resets the secondary distance odometers and exits. In step 252, control sets the $L_{NEW}$ and $H_{NEW}$, respectively equal to $L_{PREV}$ and $H_{PREV}$ for the next record.

When at least two speed range odometers ($D_{SEC1}$, $D_{SEC2}$ and $D_{SEC3}$) are exhausted, characterization slopes and offsets are created and low tire detection is enabled for those two ranges. In step 253, control determines whether the sum of $D_{SEC1}$ and $D_{SEC2}$ is equal to zero. If the sum is equal to zero, both $D_{SEC1}$ and $D_{SEC2}$ are exhausted and control continues in step 254. If the sum is not equal to zero, at least one of $D_{SEC1}$ and $D_{SEC2}$ is not exhausted and control continues in step 255. In step 254, control calculates the offsets and slopes for low and mid speed and control continues in step 300 of FIG. 4A. In step 255, control determines whether the sum of $D_{SEC2}$ and $D_{SEC3}$ is equal to zero. If the sum is equal to zero, control continues in step 256. If the sum is not equal to zero, control continues step 300 of FIG. 4A. In step 256, control calculates the offsets and slopes for mid & high speed ratios and continues in step 300 of FIG. 4A.

Offsets are the difference between one-half (0.5 or $8000 in hex) and the average like-ratios at each speed band. The slope is used to make adjustments above selected speeds within each band. The centrifugal forces produced on the diagonal and left ratios typically cancel each other out because each of these ratios has one driven and one non-driven wheel. However, poorly constructed tires may change RPK at different speeds in a nonlinear fashion. The front ratio includes two driven wheels, which propel the vehicle and produce more wheel slip at higher speeds. The secondary characterization saves each ratio in each speed band.

The offset is determined by subtracting each ratio value from the nominal ratio of 0.5 or $8000 hex. Using exemplary low speed band ratios values of LFRR=0.5 ($8000), LFRF=0.5006 ($8028), LFLR=0.5 ($8000), and average low speed (C1SPD)=28 MPH, the offsets are provided as:

$LFRR1$ offset=0.5−0.5=0, $LFRF1$ offset=0.5−0.5006=−0.0006, $LFLR1$ offset=0.5−0.5=0

Using exemplary mid speed band (>31 MPH, <62 MPH) ratio values of LFRR=0.500046 ($8003), LFRF=0.5009 ($803B), LFLR=0.499954 ($7FFD) and average low speed (C2SPD)=48 MPH, the offsets are provided as:

$LFRR2$ offset=0.5−0.500046=−0.000046, $LFRF2$ offset=0.5−0.5009=−0.0009, $LFLR2$ offset=0.5−0.49995=0.000046

Using exemplary high speed band (>62 MPH) ratio values of LFRR=0.50009 ($8006), LFRF=0.5012 ($804B), LFLR=0.499908 ($7FFA) and average low speed (C3SPD)= 68 MPH, the offsets are provided as:

$LFRR3$ offset=0.5−0.5001=−0.00009, $LFRF3$=0.5−0.50114=−0.00114, $LFLR3$=0.5−0.4999=0.000092

The low to mid speed slopes are calculated as the difference between low/mid speed bands. Using the exemplary values provided above, the following mid speed slopes are provided:

$LFRRslope1 = (LFRR2-LFRR1)/(C2SPD-C1SPD) = -0.0000023$ $LFRFslope1 = (LFRF2-LFRF1)/(C2SPD-C1SPD) = -0.000015$ $LFLRslope1 = (LFLR2-LFLR1)/(C2SPD-C1SPD) = 0.0000023$ Using the exemplary values provided above, the following mid to high speed slopes are provided:

$LFRRslope2 = (LFRR3-LFRR2)/(C3SPD-C2SPD) = -0.0000022$ $LFRFslope2 = (LFRF3-LFRF2)/(C3SPD-C2SPD) = -0.00003$ $LFLRslope2 = (LFLR3-LFLR32)/(C3SPD-C2SPD) = 0.0000022$ The proper offset and slope are used at any speed using vehicle speed with an exemplary vehicle speed of 55 mph and the following exemplary logic:

If vehicle speed>C1SPD and>C2SPD but<C3SPD
then: LFRR ratio=(LFRR ratio+LFRR2offset)+
((Vehicle speed−C2SPD)*LFRRslope2)

Slopes are used when exceeding the speed at which the data was collected. The offsets and slopes are added to the raw ratios.

The lack of a time constraint in the secondary characterization allows greater flexibility in the sample size of records that need to be collected before determining the final characterization offsets and slopes. Furthermore, the hTPM system can monitor tire digital pulse outputs (corresponding to tire pressure) to determine if a tire has low pressure. If false positives or a tire pressure fault is detected before the secondary characterization has been finished, the secondary characterization is cleared and the primary characterization will continue to be used to determine if a tire is losing pressure. Upon correction of the false positive or tire pressure fault, the secondary characterization process will start over.

Figure 4A:
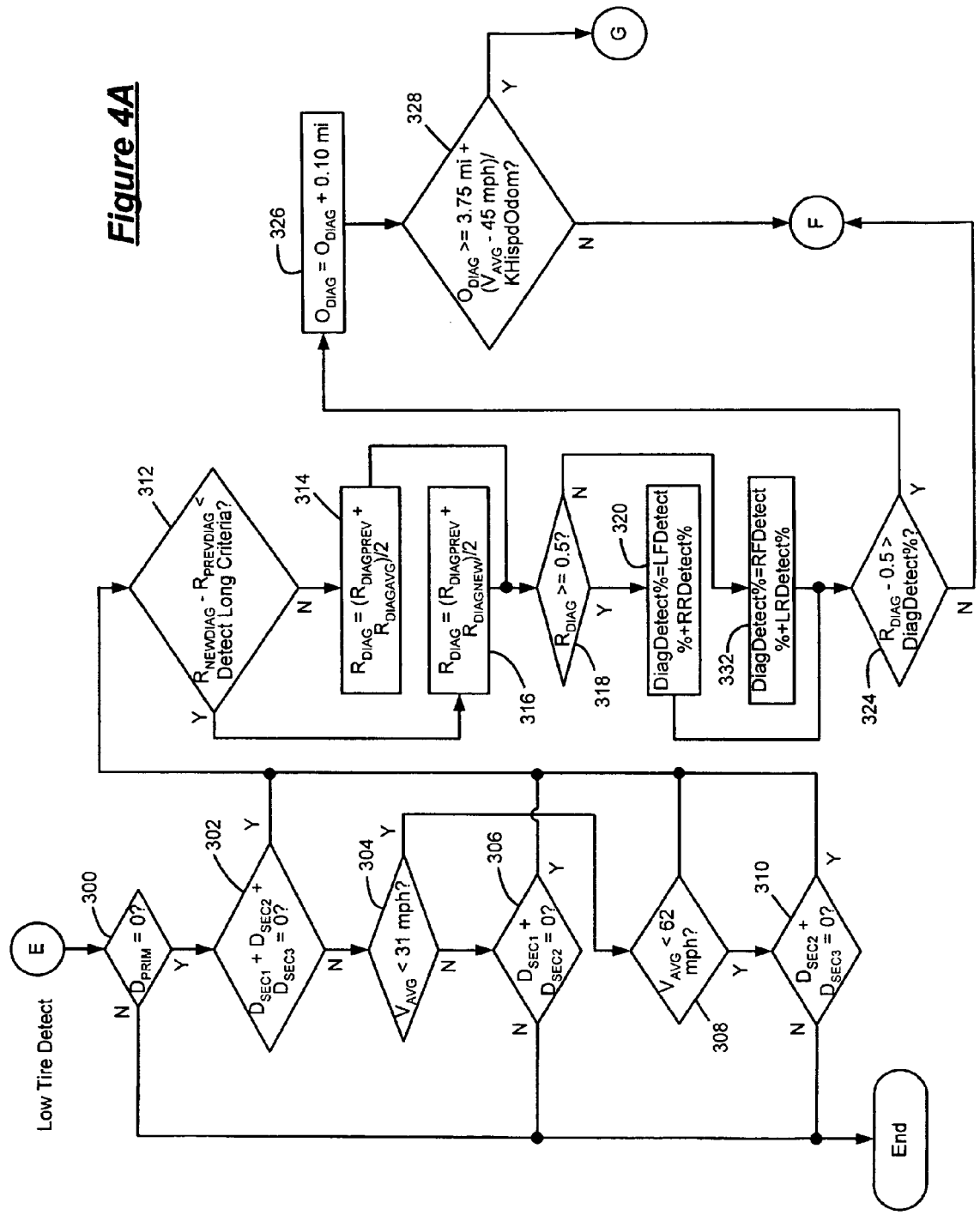
FIGS. 4A and 4B are flowcharts illustrating steps performed by the hTPM system to detect a low tire condition.
Figure 4B:
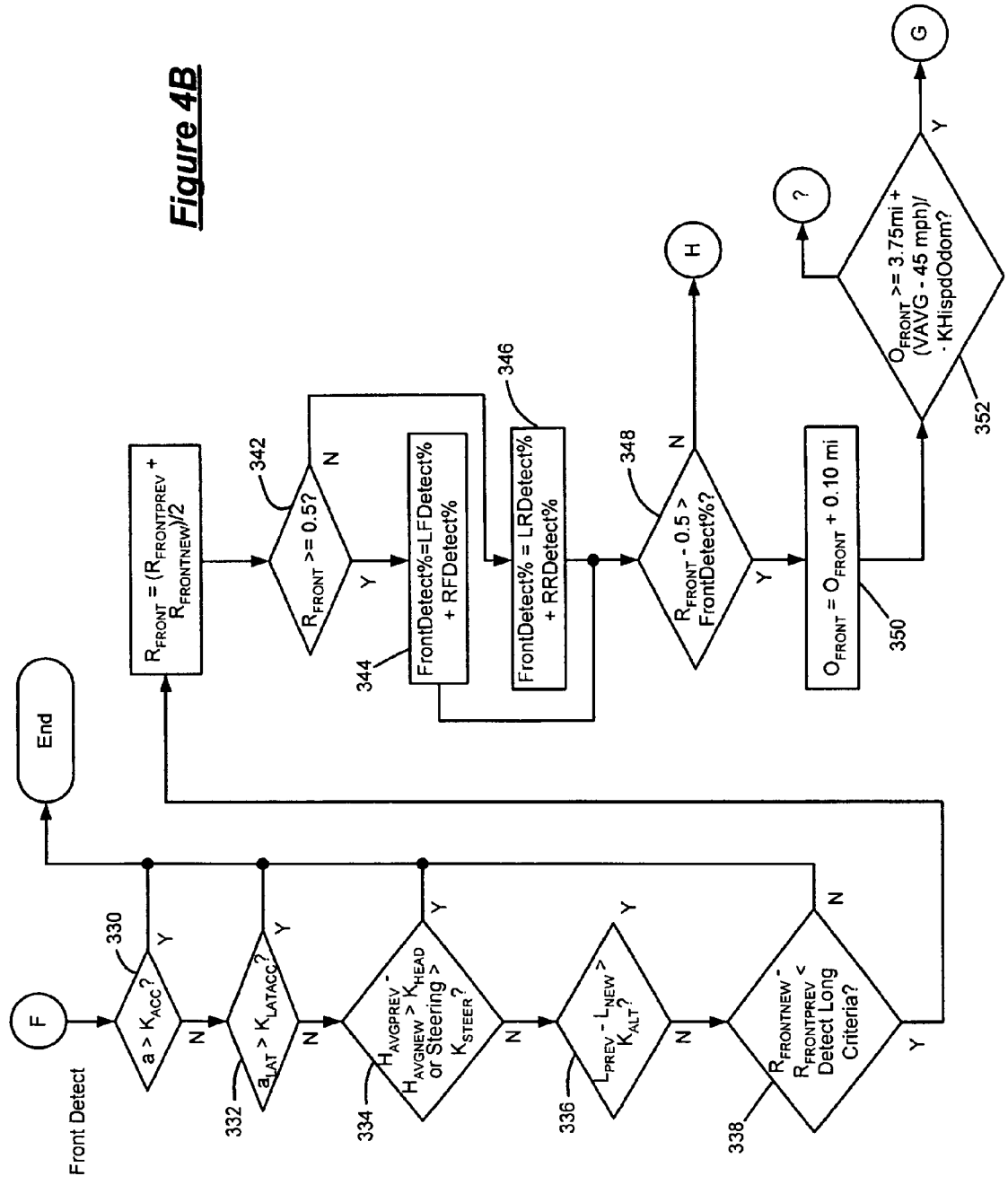

Referring now to FIGS. 4A and 4B, a low tire detection executed by the hTPM system will be described in detail. In step 300, control determines whether primary characterization is being executed by determining whether $D_{PRIM}$ is equal to zero. If $D_{PRIM}$ is not equal to zero, primary characterization is occurring and control exits because no records exist to determine whether a tire is low. If the $D_{PRIM}$ is equal to zero, control continues in step 302. In step 302, control determines whether secondary characterization is being executed by determining whether the sum of $D_{SEC1}$, $D_{SEC2}$ and $D_{SEC3}$ is zero. If the sum is equal to zero, secondary characterization is complete and control continues in step 312. If the sum is not equal to zero, secondary characterization for all speed bands is not complete and control continues in step 304.

In step 304, control determines whether the $V_{AVG}$ is less than a threshold (e.g., 31 mph). If $V_{AVG}$ is less than the threshold, control continues in step 306. If $V_{AVG}$ is not less than the threshold, control continues in step 308. In step 306, control determines whether the sum of $D_{SEC1}$ and $D_{SEC2}$ is equal to zero. If the sum is not equal to zero, at least one of $D_{SEC1}$ and $D_{SEC2}$ is not equal to zero, indicating that secondary characterization is not complete and control exits. If $D_{SEC1}$ is not equal to zero, the low speed secondary characterization is not complete and low tire testing is not allowed at this speed range. If the sum is equal to zero, low tire detection is allowed to be performed at low speed and control continues in step 312.

In step 308, control determines whether $V_{AVG}$ is greater than a threshold (e.g., 62 mph). If $V_{AVG}$ is greater than the threshold, control continues in step 310. If $V_{AVG}$ is not greater than the threshold, control continues in step 312. In step 310, control determines whether the sum of $D_{SEC2}$ and $D_{SEC3}$ is equal to zero. If the sum is equal to zero, secondary characterization in the corresponding speed band is complete and control continues in step 312. If the sum is not equal to zero, at least one of $D_{SEC2}$ and $D_{SEC3}$ is not equal to zero, indicating that the high speed secondary characterization is not complete. In this case, low tire testing is not enabled at this speed range and control exits.

In step 312, the diagonal ratio detection portion of the hTPM system is used to determine if a tire pressure is low. More specifically, control determines whether the new diagonal ratios (LFRR) meet the Detect Long Criteria by subtracting previous ratios from new ratios. If the difference is not less than Detect Long Criteria, control continues in step 314. If the difference is less than Detect Long Criteria, control continues in step 316. In step 314 control performs steady state averaging and control continues in step 318. In step 316, control sets the diagonal ratio ($R_{DIAG}$) equal to an average of the previous ratios and new ratios.

In step 318, control determines whether $R_{DIAG}$ is greater than or equal to a threshold (e.g., 0.5) to determine whether a tire pressure is low. The exemplary values of $R_{DIAG}$ provided in Table 1 below, can detect numerous conditions where a tire pressure or multiple tire pressures are low. The front ratio increases when one or both front tires are losing air and the front ratio decreases when one or both rear tires are losing air. For example, each wheel speed ring preferably has 47 teeth and 94 rising and falling edges. The exemplary rolling radius of each tire is 6.3 ft. Because $1/10^{th}$ mile is equal to 528 ft., there are approximately 7896 edges sensed in $1/10^{th}$ mile. (i.e., 528/6.3=84 revolutions*94 edges/rev=7896 edges per wheel or 31,584 edges in total). When the front tires lose air pressure, the total edge count of the front tires increases. The exemplary values provide:

LF=7907 RF=7907 LR=7885 RR=7885

$(LF+RF)/(LF+RF+LR+RR)=0.500733*65536=\$8030$
$h=\$30 \; h$

When the rear tires lose air pressure, the total rear edge count increases more than the front tires. The exemplary values provide:

LF=7879 RF=7879 LR=7913 RR=7913

$(LF+RF)/(LF+RF+LR+RR)=0.49895*65536=\$7FBB$
$h=-\$45$

A dual front low-tire detection threshold is used whenever the front ratio increases from the nominal value (i.e., characterized value) and a separate dual rear low-tire detection threshold is used whenever the front ratio decreases. For example, at 30% below placard pressure the front tires will travel an additional 3 feet in $1/10^{th}$ mile and the rear tires will travel an additional 4.5 feet in $1/10^{th}$ mile. The hTPM system equalizes the disparity between the front and rear tires.

All distance tire ratios reflect changes in the rolling radius of one or more tires due to pressure loss or other pressure fault. The changes in the three ratios can be used to specifically identify which tires are low using unique detection thresholds that will ensure a uniform detection at the same loss of pressure with any combination of tires in the front or rear of the vehicle. Separate detection thresholds are resolved for all combinations of low tires. Identification of which tires are losing pressure can be accomplished using the logic in Table 1, below. Table 1 can be used to identify which tires are losing pressure as well as determine the correct low tire detection threshold for any tire or combination of tires.

left ratio holds the value of a binary 1. The present logic assigns nothing to nominal diagonal ratios of $8000 (i.e., +/−5), assigns a positive sign to ratios greater than $8005 and a negative sign to ratios below $7FFA. As described previously, the value $8000 corresponds to a 50% (i.e., 0.5) ratio in hexadecimal. The same logic is applied to the left and front ratios using different calibrations of +/−10 and +/−12 respectively.

Referencing LF low in Table 1, all three ratios increase due to the inclusion of the left front wheel in all three ratio calculations. The aforementioned logic will assign +4 to the diagonal ratio, +2 to the front ratio and +1 to the left ratio equaling a total of 7. If the RF, RR, and LR are all low the logic will yield all negative numbers equaling −7 for this 3 low tire scenario. A low LF tire is mathematically opposite to that of the LF with 10 PSI more pressure than the other three tires, which corresponds to RF, LR, & RR low. All 15 low tire scenarios produce different ratio values. The hTPM system uses a key identification method for having unique codes using a tri-state method (positive, negative, and null). The identification method creates a set of matching positive and negative codes each representing a mathematically opposite scenario. Once it has been determined which tire or tires are low, the algorithm can calculate the proper detection threshold for each scenario. The initial threshold starts with the lowest threshold of the two front tires. Typically this is the tire supporting the most weight.

With further reference to FIG. 4A, if $R_{DIAG}$ is greater than or equal to a threshold (e.g., 0.5), control continues in step 320. If $R_{DIAG}$ is not greater than or equal to the threshold, control continues in step 332. In step 320, a weight correction detection threshold (DiagDetect %) is used to modify the diagonal detection routine. DiagDetect % is set equal to the sum of a LF detection threshold (LFDetect %) and a RR detection threshold (RRDetect %) and control continues in step 324. In step 332, DiagDetect % is set equal to the sum of a RF detection threshold (RFDetect %) and a LR detection threshold (LRDetect %) and control continues in step 324.

TABLE 1

Exemplary low tire scenarios and ratio shift.

| Low Tire scenarios Nominal-Characterization −10 PSI each tire | Diagonal $8000 | Front $8000 | Left side $8000 | Diagonal 1 > $8000 Truth Table | Front 0 = $8000 | Left side −1 < $8000 | Unique Code |
|---|---|---|---|---|---|---|---|
| LF | 8017 | 8017 | 8017 | 1 |  | 1 | 7 |
| RF | 7FE9 | 8017 | 7FE9 | −1 |  | −1 | −5 |
| LR | 7FDF | 7FDF | $8021 | −1 | −1 | 1 | −6 |
| RR | 8021 | 7FDF | 7FDF | 1 | −1 | −1 | −3 |
| LF + RF | 8000 | 802E | 8000 |  | 1 |  | 2 |
| LR + RR | 8000 | 7FBE | 8000 |  | −1 |  | −2 |
| LF + LR | 8000 | 8000 | 8038 |  |  | 1 | 1 |
| RF + RR | 8000 | 8000 | 7FC8 |  |  | −1 | −1 |
| LF + RR | 8038 | 8000 | 8000 | 1 |  |  | 4 |
| RF + LR | 7FC8 | 8000 | 8000 | −1 |  |  | −4 |
| LF + RF + LR | 7FDF | 8021 | 8021 | −1 | 1 | 1 | 3 |
| LF + RF + RR | 8021 | 8021 | 7FDF | 1 | 1 | −1 | 6 |
| LF + RR + LR | 8017 | 7FE9 | 8017 | 1 | −1 | 1 | 5 |
| RF + RR + LR | 7FE9 | 7FE9 | 7FE9 | −1 | −1 | −1 | −7 |
| LF + RF + RR + LR | 8000 | 7FF6 | 8000 |  |  |  | 0 |

The logic includes a coding system represented in a binary progression matrix. The unique code in the table corresponds to the tire or tires that have a pressure fault, where the diagonal ratio holds the highest value of a binary 4, the front ratio holds the middle value of a binary 2 and the The hTPM system compensates for the driven wheels and weight distribution of a vehicle. For example, in a front wheel drive vehicle the driven front wheels exhibit a higher incidence of wheel slip and a higher incidence of deflection due to weight. In a front wheel drive system the vehicle weight distribution is generally in the range of 60/40. Typically, the non-driven wheels show greater deflection at pressure loss than do the driven wheels at the same pressure loss because the rear tires have 20% less weight and therefore less initial deflection. A single detection threshold of 30% below the placard pressure of 30 PSI (i.e., 21 PSI) that is set for both front tires would cause both rear tires to enable the low tire telltale when the rear tires are at 23% (i.e., 23.1 PSI) below placard pressure. DiagDetect % corresponds to the diagonal ratio, LFDetect % corresponds to the left front ration, RRDetect % corresponds to the right rear ratio, RFDetect % corresponds to the right front ratio and LRDetect % corresponds to the left rear ratio.

The wheel slip and weight distribution of a vehicle will increase the likelihood of false positives for a tire pressure fault if the wheel slip and weight distribution are not compensated for. It is desirable to use separate calibrations for the dual front and dual rear tire pressure fault detection. Weight distribution of a vehicle is standard data known to all vehicle manufacturers. An exemplary vehicle has the following weight distribution:

| LF = 916.5 lbs., | RF = 824.5 lbs. | Total = 2904 lbs. |
|---|---|---|
| LR = 555 lbs., | RR = 608 lbs. | |

The LF tire is deflected the most, as it supports the most weight and the LF tire will preferably serve as the baseline detection threshold of which all other detection thresholds will be formed. Weight ratios are calculated as follows:

$LF$ wt Ratio=$LF$ wt./($LF$+$RF$+$LR$+$RR$ wt)=0.3156

$RF$ wt Ratio=$RF$ wt./($LF$+$RF$+$LR$+$RR$ wt)=0.2839

$LR$ wt Ratio=$LR$ wt./($LF$+$RF$+$LR$+$RR$ wt)=0.1911

$RR$ wt Ratio=$RR$ wt./($LF$+$RF$+$LR$+$RR$ wt)=0.2094

The primary characterization will reflect this weight distribution and correct for the additional weight of the driver and passengers or cargo.

$LFRR$ diagonal weight distribution=(0.3156+0.2094)= 0.5250

$LFRF$ front weight distribution=(0.3156+0.2839)= 0.5995

$LFLR$ left weight distribution=(0.3156+0.1911)= 0.5067

The baseline characteristic of tire deflection due to weight change is formed based on the vehicle tires sensitivity to the change in Revolutions Per Kilometer (RPK) versus additional weight. Based on the exemplary tire data above, the following calculations are empirically determined:

Tire deflection per lb.=0.00175 (RPK)

$LFRR$ Diagonal=$8009 $h$=0.500138=0.2541 (RPK)=+145 lbs.

As opposed to 3 RPK for front 30% low & 4.4 RPK for rear 30% low $LFRF$ Front=$8024 $h$=0.50055=1.013 (RPK)=+578 lbs.

As opposed to 3 RPK for fronts 30% low & 4.4 RPK for rears 30% low $LFLR$ Left=$8002 $h$=0.50004=0.0684 (RPK)=+39 lbs.

As opposed to 3.7 RPK for left or right side low

The baseline threshold is formed based on the vehicle tires sensitivity to the change in RPK versus pressure loss, as follows:

LF detect %=30%=4 Revolutions Per Kilometer (RPK)=0.3156 ($LF$ wt Ratio)

Each corner tire is then corrected to reflect the difference in tire weight deflection, as follows:

$RF$ wt correction=$LF$ wt Ratio+($LF$ wt Ratio (0.3156)–$RF$ wt Ratio (0.2839))=0.3473

$RF$ Detect %=33%=($RF$ wt correction (0.3473)/$LF$ wt Ratio (0.3156))*30%=4.4 RPK $LR$ wt correction=$LF$ wt Ratio+($LF$ wt Ratio (0.3156)–$LR$ wt Ratio(0.1911))=0.4401

$LR$ Detect %=42%=($LR$ wt correction (0.4401)/$LF$ wt Ratio (0.3156))*30%=5.6 RPK $RR$ wt correction=$LF$ wt Ratio+($LF$ wt Ratio (0.3156)–$RR$ wt Ratio(0.2094))=0.4218

$RR$ Detect %=40%=($RR$ wt correction (0.4218)/$LF$ wt Ratio (0.3156))*30%=5.3 RPK Detection thresholds for any combination of low tires may be calculated using the above factors and referenced to Table 2 below.

| Low Tire scenarios Nominal Characterization –10 PSI each tire | Diagonal $8000 | Front $8000 | Left side $8000 Truth table | Diagonal 1 > $8000 |
|---|---|---|---|---|
| LF | 8017 | 8017 | 8017 | LF Detect % |
| RF | 7FE9 | 8017 | 7FE9 | RF Detect % |
| LR | 7FDF | 7FDF | $8021 | LR Detect % |
| RR | 8021 | 7FDF | 7FDF | RR Detect % |
| LF + RF | 8000 | 802E | 8000 | LF Detect % + RF Detect % |
| LR + RR | 8000 | 7FBE | 8000 | LR Detect % + RR Detect % |
| LF + LR | 8000 | 8000 | 8038 | LF Detect % + LR Detect % |
| RF + RR | 8000 | 8000 | 7FC8 | RF Detect % + RR Detect % |
| LF + RR | 8038 | 8000 | 8000 | LF Detect % + RR Detect % |
| RF + LR | 7FC8 | 8000 | 8000 | RF Detect % + LR Detect % |
| LF + RF + LR | 7FDF | 8021 | 8021 | LF Detect % + RF Detect % + LR Detect % |
| LF + RF + RR | 8021 | 8021 | 7FDF | LF Detect % + RF Detect % + RR Detect % |

-continued

| Low Tire scenarios Nominal Characterization −10 PSI each tire | Diagonal $8000 | Front $8000 | Left side $8000 Truth table | Diagonal 1 > $8000 |
|---|---|---|---|---|
| LF + RR + LR | 8017 | 7FE9 | 8017 | LF Detect % + RR Detect % + LR Detect % |
| RF + RR + LR | 7FE9 | 7FE9 | 7FE9 | RF Detect % + RR Detect % + LR Detect % |
| LF + RF + RR + LR | 8000 | 7FF6 | 8000 | (LF + RF Detect %) − (RR + LR Detect %) |

In step 324, control determines whether the difference between $R_{DIAG}$ and a threshold (e.g., 0.5) is greater than DiagDetect %. If the difference is not greater than DiagDetect %, control continues in step 330 of FIG. 4B. If the difference is greater than DiagDetect %, control increments $O_{DIAG}$ by a tenth in step 326 and continues in step 328. In step 328, control determines whether $O_{DIAG}$ has reached a threshold distance (i.e., the distance at which the low tire telltale can be illuminated). The hTPM system adjusts the detection distance based on vehicle speed to illuminate the telltale within a given time period at any speed. The adaptive detection distance uses a minimum of calibration, $K_{MIN}$ (preferably 5 miles or 50 $\frac{1}{10}^{th}$ mile records), at speeds of $K_X$ (e.g., X=45 mph) and less. Distance is added at speeds greater than $K_X$, by dividing the delta speed by a calibration (KhispdOdom). If $O_{DIAG}$ is greater than or equal to the sum of $K_{MIN}$ and the difference of $V_{AVG}$ and $K_X$ divided by KhispdOdom, control continues in step 330 of FIG. 4B. If $O_{DIAG}$ is greater than or equal to the sum of $K_{MIN}$ and the difference of $V_{AVG}$ and $K_X$ divided by KhispdOdom, control continues in step 416 of FIG. 5A.

Referring now to FIG. 4B, control determines whether the vehicle is in steady state where valid front and side records are collected in steps 330 through 338. In step 330, control determines whether the acceleration (a) is greater than a calibration ($K_{ACC}$). If a is greater than $K_{ACC}$, control exits. If a is not greater than $K_{ACC}$, control determines whether the lateral acceleration ($a_{LAT}$) is greater than a calibration ($K_{LATACC}$) in step 332. If $a_{LAT}$ is greater than $K_{LATACC}$, control exits. If $a_{LAT}$ is not greater than $K_{LATACC}$, control determines whether the difference between $H_{AVGPREV}$ and $H_{AVGNEW}$ is greater than $K_{HEAD}$ or whether a steering angle is greater than a calibration steering angle ($K_{STEER}$) in step 334. If the differences are greater than $K_{HEAD}$ or $K_{STEER}$, respectively, the vehicle is traveling along a curve which would result in a bad side record and control exits. If the difference is less than $K_{HEAD}$ or $K_{STEER}$, respectively, control continues in step 336.

In step 336, control determines whether the fuel float sensor indicates the vehicle is on a grade or incline that would yield a bad front record. If the vehicle is on an incline, control exits. If the vehicle is not on an incline, control determines whether the difference between $R_{NEW}$ and $R_{PREV}$ is within a repeatability dead band in step 338. If the difference is not repeatable, control exits. If the difference is repeatable, control forms a new front ratio average ($R_{NEWAVG}$) in step 340. In step 342, control determines whether to use the front or rear tires detection threshold by determining whether $R_{FRONT}$ is greater than or equal to 0.5. If $R_{FRONT}$ is greater than or equal to 0.5, control continues in step 344. If $R_{FRONT}$ is not greater than or equal to 0.5, control continues in step 346. In step 344, control sets the weight corrected front low tire detection (FrontDetect %) equal to the sum of LFDetect % and RFDetect % and control continues in step 348. In step 346, control sets FrontDetect % equal to the sum of LRDetect % and RRDetect % and control continues in step 348.

In step 348, control determines whether the difference between $R_{FRONT}$ and the reference value (e.g., 0.5) is greater than FrontDetect %. If the difference is greater than the FrontDetect %, control continues in step 350. If the difference is not greater than FrontDetect %, control continues in step 400 of FIG. 5A. In step 350, control increments the front odometer/counter ($O_{FRONT}$) a tenth of a mile. In step 352, control determines whether $O_{FRONT}$ has reached the distance necessary to illuminate the low tire telltale. The distance that is necessary to turn on the telltale is adapted to vehicle speed, as described above. If $O_{FRONT}$ has not achieved the required distance, control loops back to process the next data samples. If $O_{FRONT}$ has achieved the required distance, control continues in step 416 of FIG. 5A.

Figure 5A:
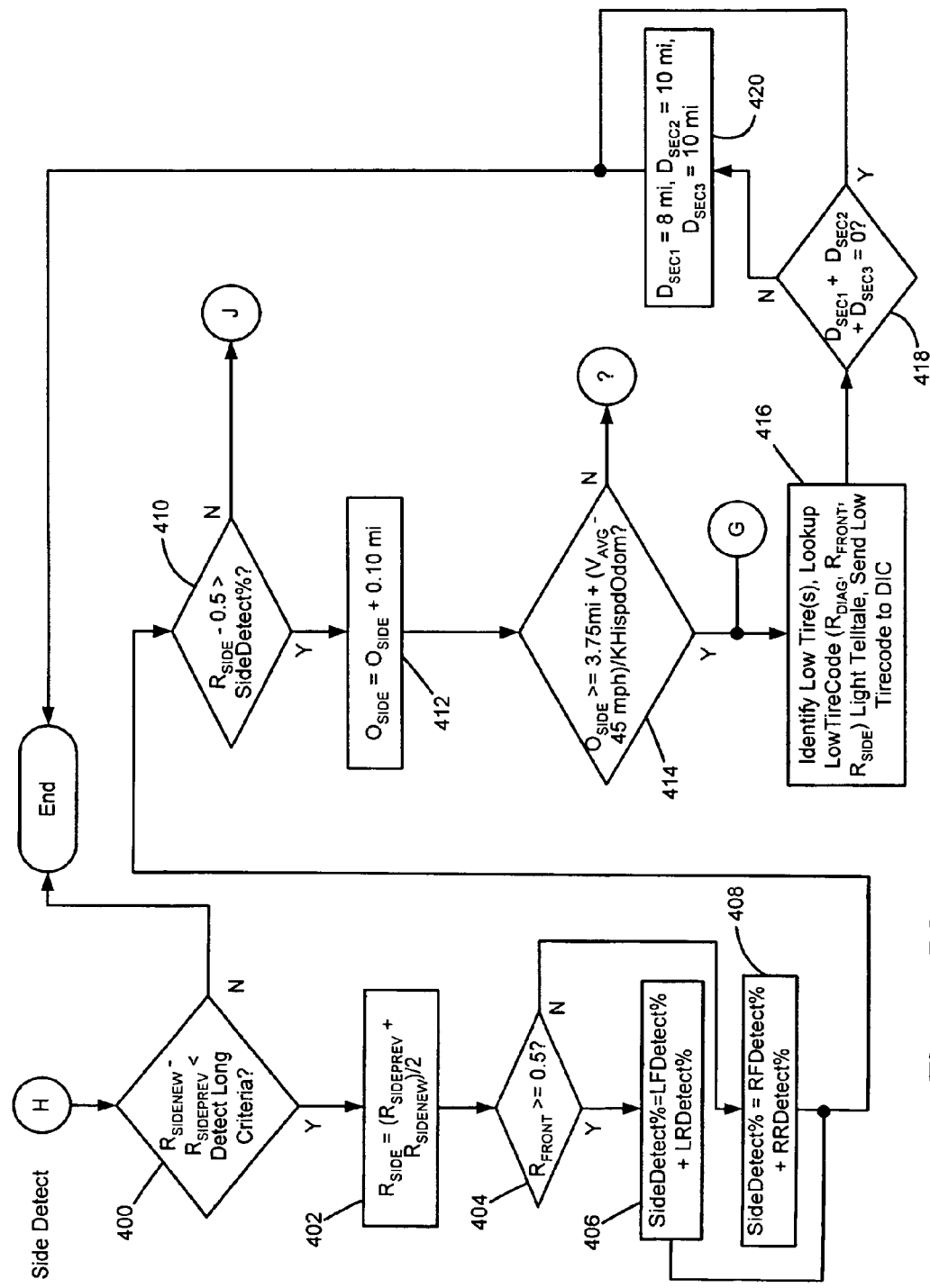
FIGS. 5A is a flowchart illustrating further steps performed by the hTPM system to detect a low tire condition.
Figure 5B:
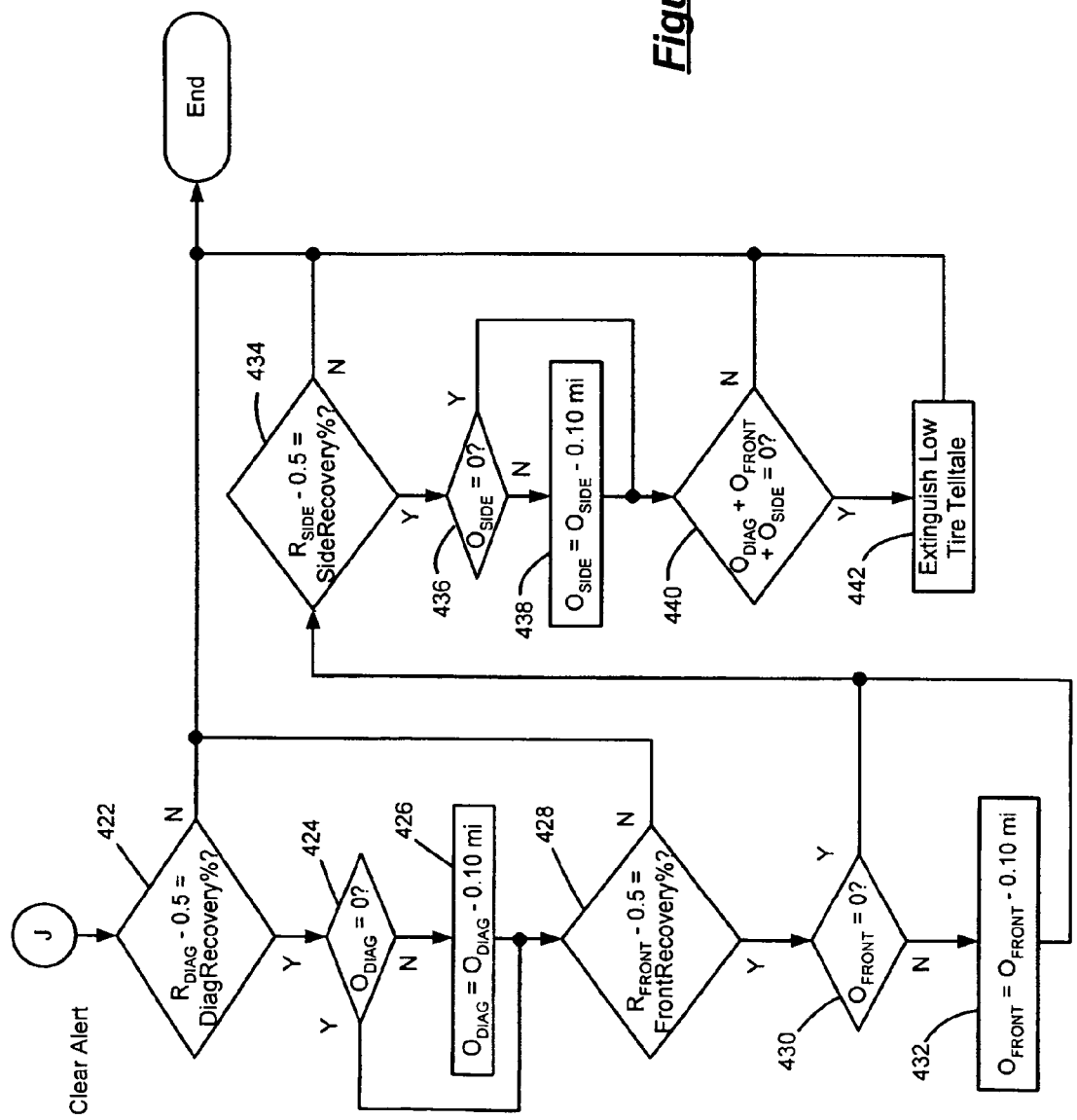
FIG. 5B is a flowchart illustrating steps performed by the hTPM system to reset a low tire condition.

Referring now to FIGS. 5A and 5B, the indirect low tire detection executed by the hTPM system will be described in further detail. In step 400, control determines whether the differences between the new side ratio ($R_{SIDE}$) and the previous side ratio ($R_{SIDEPREV}$) is greater than Detect Long Criteria. If difference is not greater than Detect Long Criteria, control exits. If the difference is greater than Detect Long Criteria, control continues in step 402. In step 402, control updates $R_{SIDE}$ as the average $R_{SIDEPREV}$ and $R_{SIDENEW}$. In step 404, control determines whether $R_{SIDE}$ is greater than or equal to the reference value (e.g., 0.5). If $R_{SIDE}$ is greater than or equal to 0.5, control continues in step 406. If $R_{SIDE}$ is not greater than or equal to 0.5, control continues in step 406. In step 406, control sets a weight corrected side ratio threshold (SideDetect %) equal to the sum of LFDetect % and LRDetect %. In step 408, control sets SideDetect % equal to the sum of RFDetect % and RRDetect %.

In step 410, control determines whether the difference between $R_{SIDE}$ and the reference value (e.g., 0.5) is greater than SideDetect %. If the difference is greater, control continues in step 412. If the difference is not greater, control continues in step 422 of FIG. 5B. In step 412, control increments the side odometer/counter ($O_{SIDE}$) a tenth of a mile. In step 414, control determines whether $O_{SIDE}$ has reached the distance necessary to illuminate the low tire telltale. The distance that is necessary to turn on the telltale is adapted to vehicle speed, as described above. If $O_{SIDE}$ has achieved the distance required, control continues in step 416. If $O_{SIDE}$ has not achieved the distance required control loops back to process the next data samples.

In step 416, control identifies the low tire or tires using Tables 1 and 2 and transmits the tire code visually and/or audibly to an operator via an instrument panel or other device. Low tire alarms are enabled while conducting secondary characterization. In step 418, control determines whether secondary characterization is being executed by determining whether the sum of $D_{SEC1}$, $D_{SEC2}$ and $D_{SEC3}$ is equal to zero. If the sum is not equal to zero, secondary characterization is being executed and control continues in step 420. If the sum is equal to zero, secondary characterization is not being executed and control exits in FIG. 5B. In step 420, control resets the secondary characterization odometers (e.g., $D_{SEC1}$=8 miles, $D_{SEC2}$=16 miles and $D_{SEC3}$=32 miles).

Referring now to FIG. 5B, the hTPM system can clear the alert. More specifically, control determines whether the difference between diagonal ratios and the reference value (e.g., 0.5) is less than or equal to a recovery threshold (DiagRecovery %). If the difference is not less than or equal to DiagRecovery %, control exits. If the difference is less than DiagRecovery %, control continues in step 424. In step 424, control determines whether $O_{DIAG}$ is expired (i.e., =0). If $O_{DIAG}$ is equal to zero, control continues in step 428. If $O_{DIAG}$ is not equal to zero, control decrements $O_{DIAG}$ by a tenth of a mile and control continues in step 428.

In step 428, control determines whether the difference between the front ratios and the reference value (e.g., 0.5) is less than or equal to a recovery threshold (FrontRecovery %). If the difference is not less than FrontRecovery %, control exits. If the difference is less than or equal to FrontRecovery %, control continues in step 430. In step 430, control determines whether $O_{FRONT}$ has expired (i.e., =0). If $O_{FRONT}$ is equal to zero, control continues in step 434. If $O_{FRONT}$ is not equal to zero, control decrements $O_{FRONT}$ by a tenth of a mile in step 432.

In step 434, control determines whether the difference between the side ratios and the reference value (e.g., 0.5) is less than or equal to a recovery threshold (SideRecovery %). If the difference is not less than SideRecovery %, control exits. If the difference is less than or equal to SideRecovery %, control continues in step 436. In step 436, control determines whether $O_{SIDE}$ has expired (i.e., =0). If $O_{SIDE}$ is equal to zero, control continues in step 440. If $O_{SIDE}$ is not equal to zero, control decrements $O_{SIDE}$ by a tenth of a mile in step 438. In step 440, control determines whether the sum of $O_{DIAG}$, $O_{FRONT}$ and $O_{SIDE}$ is equal to zero. If the sum is not equal to zero, control exits. If the sum is equal to zero, control extinguishes the low pressure telltale in step 442 and control exits.

Figure 6:
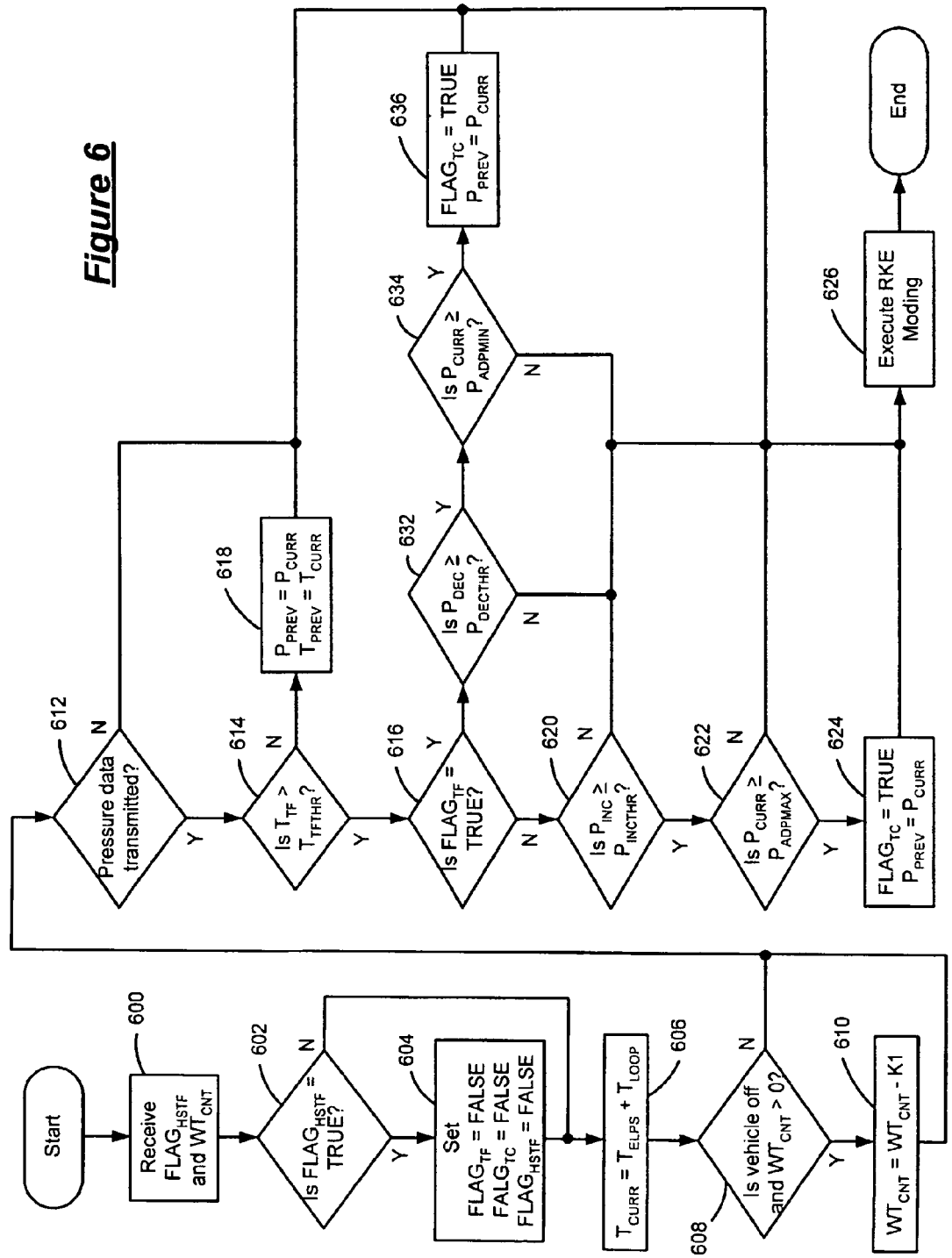
FIG. 6 is a flowchart illustrating the steps performed by the hTPM system to automatically initiate characterization.

As discussed above, the hTPM system includes both the dTPM system integrated with the iTPM system. In this manner, the hTPM system provides enhanced features, as will be discussed in further detail below. Referring now to FIG. 6, the steps executed by the dTPM portion of the hTPM system to automatically initiate tire characterization will be described in detail. In step 600, the first control module (e.g., the RKE module) initiates a real-time interrupt loop and attempts to receive a tire fill flag ($FLAG_{TF}$) and a warm tire counter ($WT_{CNT}$) value from the second control module (e.g., the BCM). In step 602, control determines whether the second control module has received back a handshake tire fill flag ($FLAG_{HSTF}$) from the first control module. If the vehicle is turned off, data from the second control module will not be received. In this case, the first control module runs autonomously until the vehicle is turned on. If the second control module has received $FLAG_{HSTF}$, control continues in step 604. If the second control module has not received $FLAG_{HSTF}$, control continues in step 606.

In step 604, $FLAG_{TF}$ and $FLAG_{HSTF}$ are set equal to FALSE. In step 606, a current timer ($T_{CURR}$) is updated by incrementing an elapsed time ($T_{ELPS}$) by a real-time control loop time ($T_{LOOP}$). In step 608, control determines whether the vehicle is off and $WT_{CNT}$ is greater than zero. If both the vehicle is off and $WT_{CNT}$ is greater than zero, control continues in step 610. If either the vehicle is not off or $WT_{CNT}$ is not greater than zero, control continues in step 612. In step 610, $WT_{CNT}$ is decreased by calibratable time constant ($K_Y$) (e.g., Y=1 minute) that closely represents the amount of the real-time control loop.

In step 612, control determines whether the pressure sensor generated a signal. If the pressure sensor did not generate a signal, control continues in step 626. If the pressure sensor did generate a signal, control continues in step 614. In step 614, control determines whether a maximum tire fill time ($T_{TF}$) (e.g., 4 minutes) has exceeded a tire fill threshold time ($T_{TFTHR}$). If $T_{TF}$ exceeds $T_{TFTHR}$, control continues in step 616. If $T_{TF}$ does not exceed $T_{TFTHR}$, control continues in step 618. In step 618, a previous tire pressure ($P_{PREV}$) is set equal to a current tire pressure ($P_{CURR}$), a previous time ($T_{PREV}$) is set equal to $T_{CURR}$ and control continues in step 626. $P_{CURR}$ is a current pressure reading from the pressure sensor.

In step 616, control determines whether $FLAG_{TF}$ is equal to TRUE. If $FLAG_{TF}$ is TRUE, control continues in step 632. If $FLAG_{TF}$ is not TRUE, control continues in step 620. In step 620, control determines whether a pressure increase ($P_{INC}$) exceeds an increase threshold ($P_{INCTHR}$) (e.g., 3 PSI). More specifically, control determines $P_{INC}$ as the difference between $P_{PREV}$ (e.g., $T_{TF}$ minutes old) and $P_{CURR}$. If $P_{INC}$ is greater than or equal to $P_{INCTHR}$, control continues in step 622. If $P_{INC}$ is not greater than or equal to $P_{INCTHR}$, control continues in step 626.

In step 622, control determines whether $P_{CURR}$ is greater than an adaptive maximum tire pressure ($P_{ADPMAX}$). $P_{ADPMAX}$ is determined based on placard calibration pressure (e.g., 33 PSI) plus any heat related pressure increase. The second control module keeps track of tire heat by increasing $WT_{CNT}$ based on real-time and vehicle speed and converting $WT_{CNT}$ to a pressure increase. $WT_{CNT}$ is converted using calibratable constant ($K_{COOLT}$). If $P_{CURR}$ is not greater than or equal to $P_{ADPMIN}$, control continues in step 626. If $P_{CURR}$ is greater than or equal to $P_{ADPMIN}$, control continues in step 624. In step 624, control sets $FLAG_{TF}$ to TRUE and sets $P_{PREV}$ equal to $P_{CURR}$.

In step 632, control determines whether a pressure decrease ($P_{DEC}$), determined as a difference between $P_{PREV}$ and $P_{CURR}$, is greater than or equal to a calibratable threshold pressure decrease ($P_{DECTHR}$) (e.g., 2 PSI). If $P_{DEC}$ is not greater than or equal to $P_{DECTHR}$, control continues in step 626. If $P_{DEC}$ is greater than or equal to $P_{DECTHR}$, control continues in step 634. In step 634, control determines whether $P_{CURR}$ is less than or equal to an adaptive minimum pressure ($P_{ADPMIN}$). $P_{ADPMIN}$ is determined based on a minimum placard pressure (e.g., 31 PSI) plus any heat related pressure increase. The heat related pressure increase is calculated as described above. If $P_{CURR}$ is not less than or equal to $P_{ADPMIN}$, control continues in step 626. If $P_{CURR}$ is less than or equal to $P_{ADPMIN}$, control sets a tire characterization flag ($FLAG_{TC}$) to TRUE, sets $P_{PREV}$ equal to $P_{CURR}$ in step 636 and control continues in step 626.

In step 626, control determines whether an first control module transmission (e.g., RKE transmission) was received by the second control module. The transmission indicates a tire fill event has occurred. If the first control module transmission was received, control continues in step 628. If the first control module transmission was not received, control ends. In step 628, control processes all RKE moding and ends.

Figure 7:
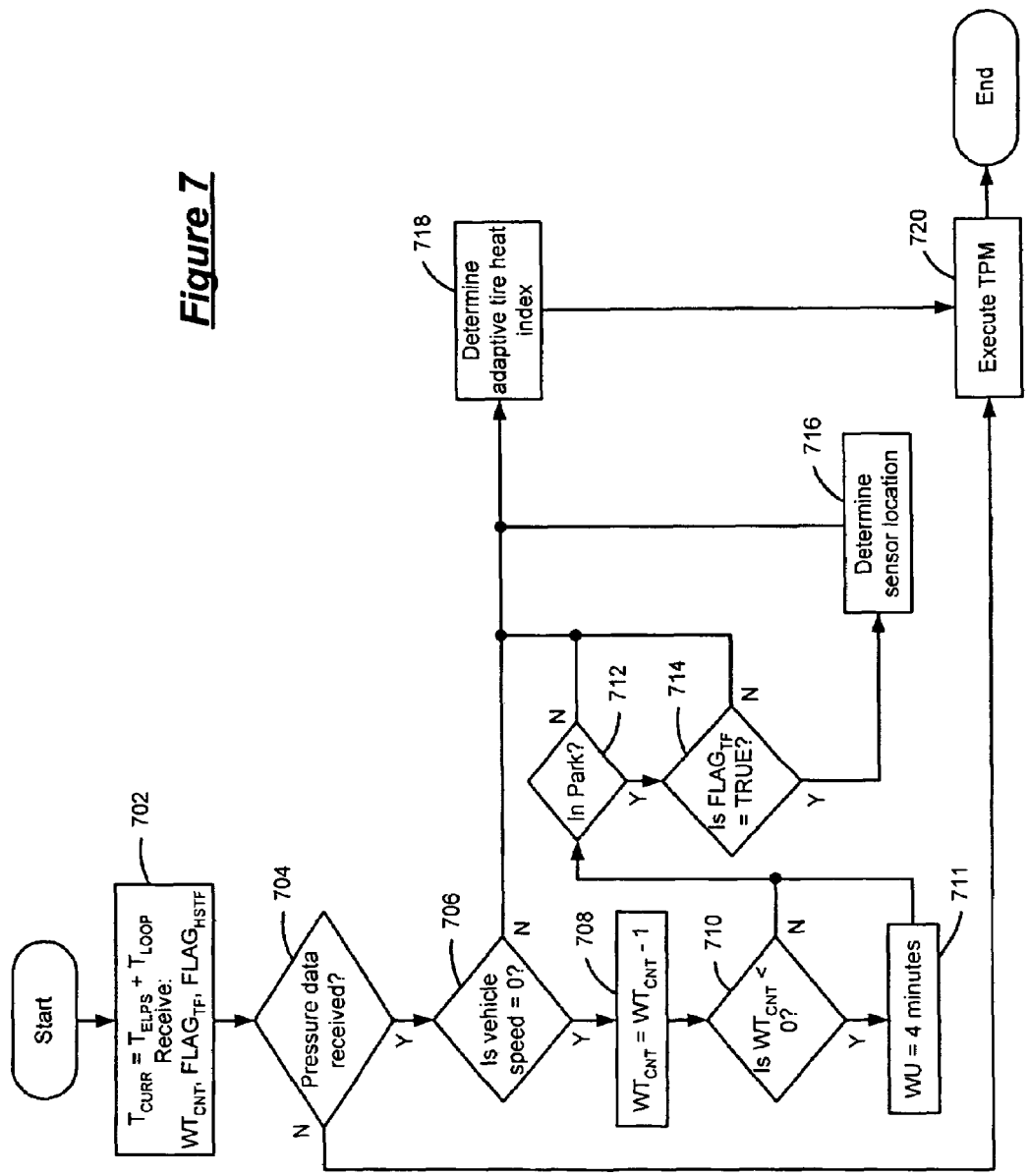
FIG. 7 is a flowchart illustrating preparatory steps executed by the hTPM system for TPM.

Referring now to FIG. 7, the steps executed by the hTPM system to adaptively determine a tire temperature will be described in detail. In step 702, control updates $T_{CURR}$ by incrementing $T_{ELPS}$ by $T_{LOOP}$ and determining $WT_{CNT}$, FLAG$_{TF}$ and FLAG$_{TFHS}$. In step 704, control determines whether pressure signal data has been received by the control module. If pressure data has not been received, control initiates TPM in step 730. If pressure data has been received, control determines whether the vehicle is stopped in step 706. If the vehicle is not stopped, control can not initiate the automatic characterization sequence and continues to initiate an adaptive tire heat index routine in step 718. If the vehicle is stopped, control decrements WT$_{CNT}$ in step 708.

In step 710, control determines whether WT$_{CNT}$ is equal to zero. If the WT$_{CNT}$ is equal to zero, control sets warm up variable WU to a calibration value (e.g., 4 minutes) in step 711. If WT$_{CNT}$ is not equal to zero (e.g., the vehicle is stationary for less than a threshold period of time (e.g., 1 hour)), control continues in step 712. In step 712, control determines whether the transmission is in park. If the transmission is a manual transmission, control checks for neutral and park brake engagement. If the vehicle is in park, control continues in step 714. If the vehicle is not in park, control continues in step 718. In step 714, control determines whether FLAG$_{TF}$ is TRUE. If FLAG$_{TF}$ is TRUE, control continues in step 716. If FLAG$_{TF}$ is not TRUE, control continues in step 718. In step 716, control determines the location of the pressure sensor (SENS$_{LOC}$), as explained in further detail below. In step 718, control determines an adaptive tire index, as explained in further detail below. In step 720, control executes the TPM routine as described in detail above.

Figure 8:
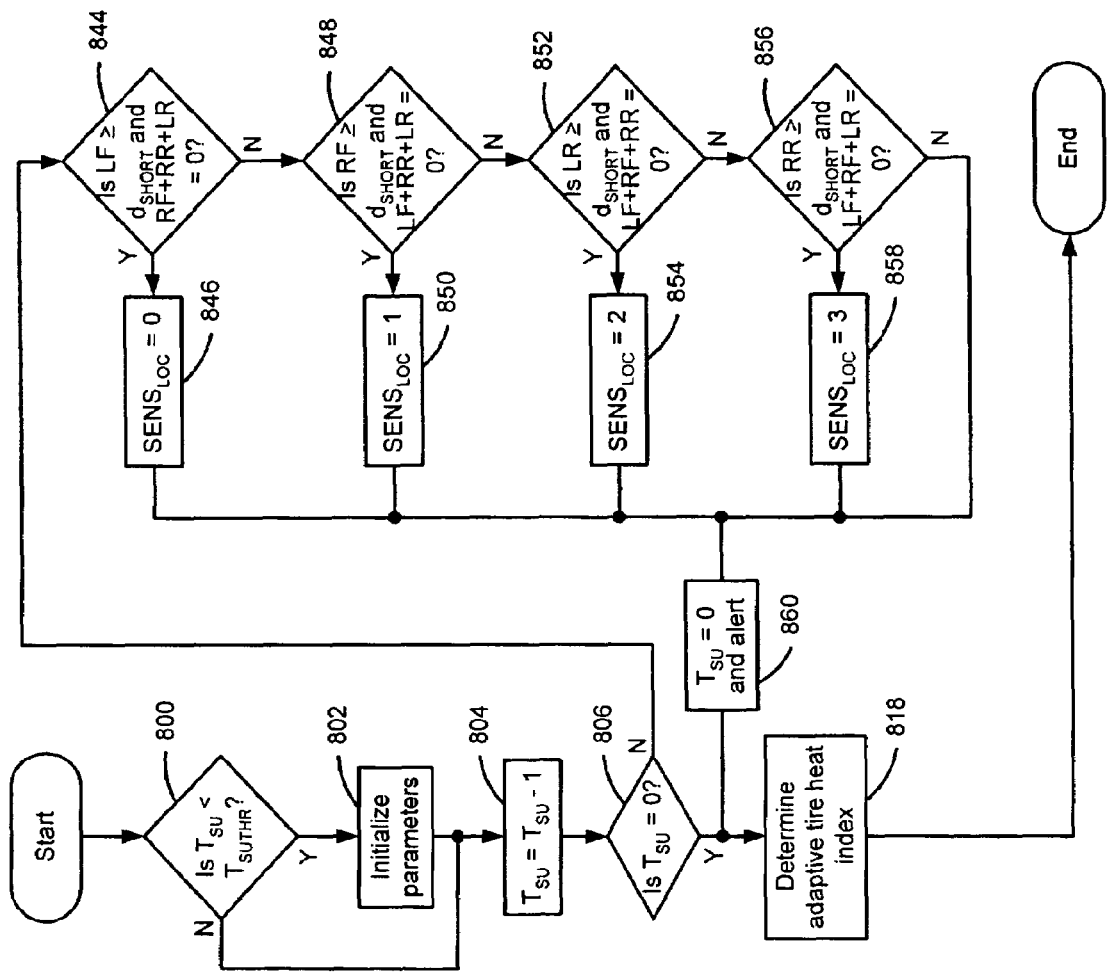
FIG. 8 is a flowchart illustrating the steps performed by the hTPM system to determine a location of a pressure sensor of the hTPM system.

Referring now to FIG. 8, the steps executed by the hTPM system to determine SENS$_{LOC}$ will be discussed in detail. In step 800, control determines whether a spin-up time (T$_{SU}$) is less than a spin-up threshold (T$_{SUTHR}$) (e.g., 15 seconds). If T$_{SU}$ is less than T$_{SUTHR}$, control continues in step 804. If T$_{SU}$ is not less than T$_{SUTHR}$, control initiates automatic characterization parameters in step 802. More specifically, control asserts the horn and/or telltale, sets FLAG$_{HSTF}$ to TRUE, resets the primary and/or secondary characterization odometers and T$_{SU}$ equal to T$_{SUTHR}$. In step 804, control decrements T$_{SU}$.

In step 806, control determines whether T$_{SU}$ is equal to zero. It should be noted that T$_{SU}$ is a count-down timer having an initial value (e.g., 15 seconds). If T$_{SU}$ is equal to zero, control continues in step 818. If T$_{SU}$ is not equal to zero, control continues in step 844. If the time limit has not expired, the hTPM system checks each individual wheel pulse counter to see if a single wheel has rotated at least 1 revolution while all other wheels have remained stationary. The individual wheel is flagged as the new sensor location. The left front wheel is processed in steps 244 and 246, the right front in steps 248 and 250, the left rear in steps 252 and 254 and the right rear in steps 256 and 258. After any wheel is identified as the sensor location, control which sounds the horn and clears the spinning tire counter in step 860 and control continues in step 818.

Figure 9:
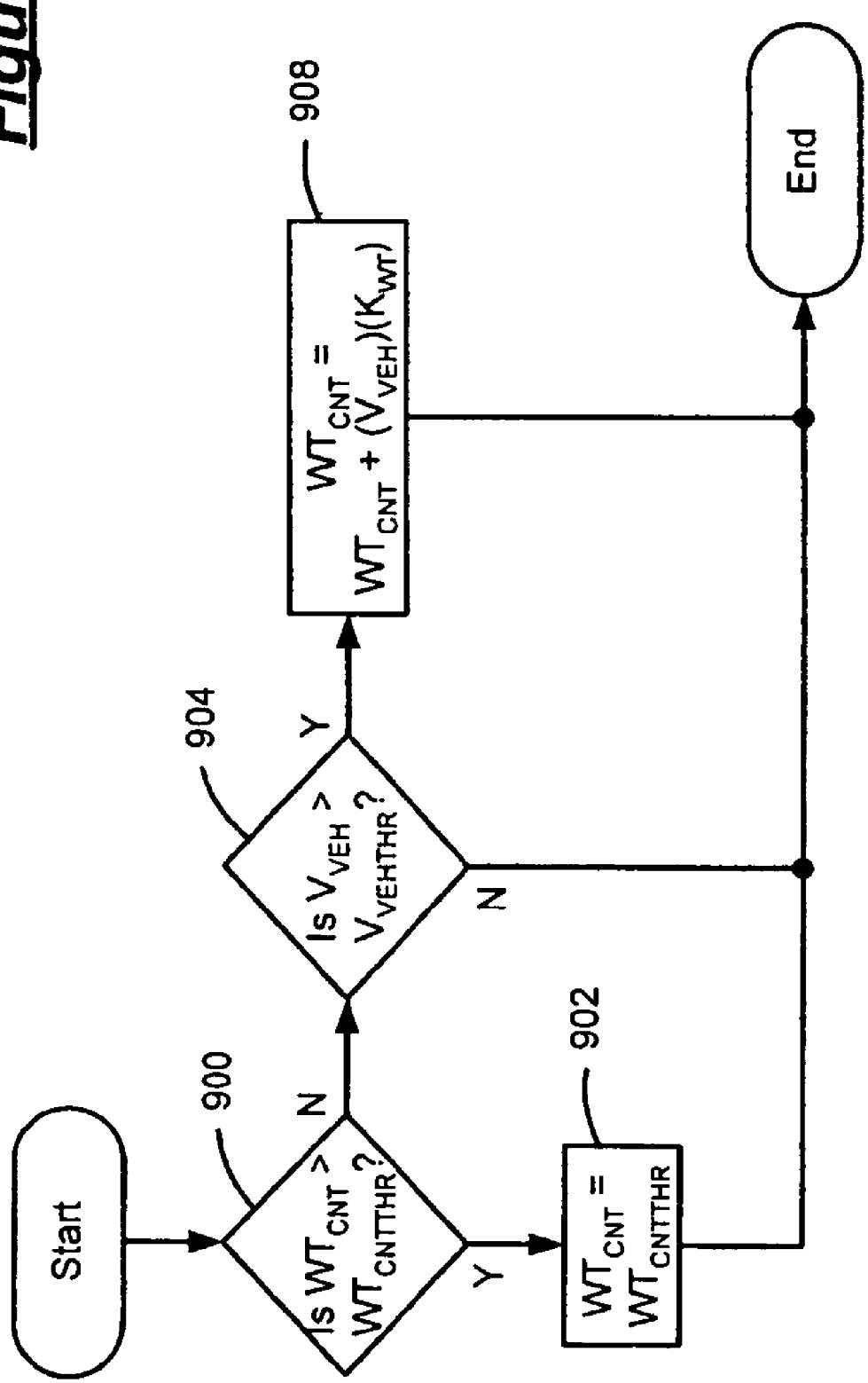
FIG. 9 is a flowchart illustrating the steps performed by the hTPM system during an adaptive counter update.

Referring now to FIG. 9, the steps executed to determine the adaptive heat index will be described in detail. In step 900, control determines whether WT$_{CNT}$ is greater than a threshold (WT$_{CNTTHR}$) (e.g., 60 minutes). If WT$_{CNT}$ is greater than WT$_{CNTTHR}$, the warm tire routine is complete and control continues in step 902. If WT$_{CNT}$ is not greater than WT$_{CNTTHR}$, control continues in step 904. In step 902, control sets WT$_{CNT}$ equal to WT$_{CNTTHR}$, control executes TPM in step 906 and control ends. In step 904, control determines whether the vehicle speed (V$_{VEH}$) is greater than a threshold V$_{VEHTHR}$ (e.g., 31 mph or 50 kph). If V$_{VEH}$ is not greater than V$_{VEHTHR}$, control ends. If V$_{VEH}$ is greater than V$_{VEHTHR}$, control updates WT$_{CNT}$ in step 908 and control ends. Control updates WT$_{CNT}$ by increasing its value based V$_{VEH}$ multiplied by tire specific thermodynamic calibration (K$_{WT}$). K$_{WT}$ may be a nonlinear function set to increase the value of WT$_{CNT}$ a minimum of 1-count at 50 kph and 9-counts at 150 kph. An alternative routine to accomplish the temperature delta is to compare the internal tire temperature (available on most TPM sensors) with an ambient temperature determined using an ambient temperature sensor. The adaptive heat timer enables tire warm-up to be accounted for in vehicles without ambient temperature sensors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A tire pressure monitoring system for a vehicle that rides on N tires during use, comprising:
   N rotation sensors that generate N rotation signals based on rotation of respective ones of said N tires;
   M pressure sensors that are associated with M of said N tires and that generate pressure signals based on pressure within respective ones of said M of said N tires; and
   a control module that receives said N rotation signals from said N tires and said M pressure signals from said M of said N tires and that monitors a pressure condition in at least one tire other than said M of said N tires based thereon; wherein said control module determines a first distance one of said N tires has traveled based on said rotation signal associated with said one of said N tires, determines a second distance another of said N tires has traveled based on said rotation signal associated with said another of said N tires and monitors said pressure condition based on said first distance and said second distance.

2. The tire pressure monitoring system of claim 1 wherein M<N.

3. The tire pressure monitoring system of claim 2 wherein M is equal to 1.

4. The tire pressure monitoring system of claim 1 wherein said control module characterizes a tire pressure monitoring baseline based on said N rotation signals and said M pressure signals and monitors said pressure condition based on said baseline.

5. The tire pressure monitoring system of claim 4 wherein said control module characterizes said baseline when said M pressure signals indicate a pressure change that exceeds a threshold pressure change within a threshold time.

6. The tire pressure monitoring system of claim 1 wherein said control module monitors said pressure condition of at least one of said N tires based on said pressure signals.

7. The tire pressure monitoring system of claim 1 wherein said N rotational sensors include N pulse generating sensors, wherein said N rotation signals include N pulse signals.

8. The tire pressure monitoring system of claim 7 wherein said control module accumulates individual pulse sums from each of said N pulse generating sensors and generates a record of a sum of total pulses.

9. The tire pressure monitoring system of claim 8 wherein said control module monitors said pressure condition based on said record.

10. The tire pressure monitoring system of claim 8 wherein said control module compares said record to a previous record to determine whether said record is valid.

11. The tire pressure monitoring system of claim 7 wherein said control module determines a pulse ratio for each of said N tires based on said N pulse signals and said pressure condition is monitored based on said pulse ratios.

12. The tire pressure monitoring system of claim 1 wherein said first and second distances each comprise a distance record that is compared to a criteria to determine whether said distance record is valid.

13. A tire pressure monitoring system for a vehicle having a plurality of inflatable tires, comprising:
 a plurality of rotation sensors that generate rotation signals based on a rotation of each of said tires;
 a pressure sensor that is responsive to a pressure within one of said tires and generates a pressure signal based on said pressure; and
 a control module that receives said rotation signals and said pressure signal, and that detects a low pressure condition of at least one of said tires based on said rotation signals and said pressure signal, wherein said control module determines a first distance one of said tires has traveled based on said rotation signal associated with said one of said tires, determines a second distance another of said tires has traveled based on said rotation signal associated with said another of said tires and detects said low pressure condition based on said first distance and said second distance.

14. The tire pressure monitoring system of claim 13 wherein said control module characterizes a tire pressure monitoring baseline based on said rotation signals and said pressure signal and detects said low pressure condition based on said baseline.

15. The tire pressure monitoring system of claim 13 wherein said control module characterizes said baseline when said pressure signal indicates a pressure change that exceeds a threshold pressure change within a threshold time.

16. The tire pressure monitoring system of claim 13 wherein said control module detects said low pressure condition of at least one of said tires based on said pressure signal.

17. The tire pressure monitoring system of claim 13 wherein said rotational sensors include pulse generating sensors, wherein said rotation signals include pulse signals.

18. The tire pressure monitoring system of claim 17 wherein said control module accumulates individual pulse sums from each of said pulse generating sensors and generates a record of a sum of total pulses.

19. The tire pressure monitoring system of claim 18 wherein said control module detects said low pressure condition based on said record.

20. The tire pressure monitoring system of claim 18 wherein said control module compares said record to a previous record to determine whether said record is valid.

21. The tire pressure monitoring system of claim 17 wherein said control module determines a pulse ratio for each of said tires based on said pulse signals and said low pressure condition is detected based on said pulse ratios.

22. The tire pressure monitoring system of claim 13 wherein said first and second distances each comprise a distance record that is compared to a criteria to determine whether said distance record is valid.

23. A tire pressure monitoring system for a vehicle having a plurality of inflatable tires, comprising:
 a plurality of rotation sensors that generate rotation signals based on a rotation of each of said tires;
 a pressure sensor that is responsive to a pressure within one of said tires and generates a pressure signal based on said pressure; and
 a control module that receives said rotation signals and said pressure signal, that characterizes a tire pressure monitoring baseline based on said rotation signals and said pressure signal and that detects a low pressure condition of at least one of said tires based on said baseline and said rotation signals, wherein said control module determines a first distance one of said tires has traveled based on said rotation signal associated with said one of said tires, determines a second distance another of said tires has traveled based on said rotation signal associated with said another of said tires and detects said low pressure condition based on said first distance and said second distance.

24. The tire pressure monitoring system of claim 23 wherein said control module characterizes said baseline when said pressure signal indicates a pressure change that exceeds a threshold pressure change within a threshold time.

25. The tire pressure monitoring system of claim 23 wherein said control module detects said low pressure condition of at least one of said tires based on said pressure signal.

26. The tire pressure monitoring system of claim 23 wherein said rotation sensors include pulse generating sensors, wherein said rotation signals include pulse signals.

27. The tire pressure monitoring system of claim 26 wherein said control module accumulates individual pulse sums from each of said pulse generating sensors and generates a record of a sum of total pulses.

28. The tire pressure monitoring system of claim 27 wherein said control module detects said low pressure condition based on said record.

29. The tire pressure monitoring system of claim 27 wherein said control module compares said record to a previous record to determine whether said record is valid.

30. The tire pressure monitoring system of claim 26 wherein said control module determines a pulse ratio for each of said tires based on said pulse signals and said low pressure condition is detected based on said pulse ratios.

31. The tire pressure monitoring system of claim 23 wherein said first and second distances each comprise a distance record that is compared to a criteria to determine whether said distance record is valid.

32. A method of detecting a low pressure condition in one of a plurality of tires of a vehicle, comprising:
 generating rotation signals based on a rotation of each of said tires;
 generating a pressure signal from a pressure sensor based on a pressure within one of said tires;
 detecting said low pressure condition based on said rotation signals and said pressure signal
 determining a first distance one of said tires has traveled based on said rotation signal associated with said one of said tires;
 determining a second distance another of said tires has traveled based on said rotation signal associated with said another of said tires; and
 detecting said low pressure condition based on said first distance and said second distance, and
 operating a signal to advise of said low pressure condition.

33. The method of claim 32 further comprising determining a location of said pressure sensor based on a change in said pressure signal and a rotation of one of said tires within a threshold time after said change in said pressure signal occurs.

34. The method of claim 32 further comprising:
initiating a characterization routine based on said pressure signal to generate a tire pressure monitoring baseline; and
detecting said low pressure condition of at least one of said tires based on said baseline and said rotation signals.

35. The method of claim 34 wherein said step of initiating said characterization routine occurs when said pressure signal indicates a pressure change that exceeds a threshold pressure change within a threshold time.

36. The method of claim 32 further comprising detecting said low pressure condition of at least one of said tires based on said pressure signal.

37. The method of claim 32 wherein said rotation sensors include pulse generating sensors and said rotation signals include pulse signals.

38. The method of claim 37 further comprising accumulating individual pulse sums from each of said pulse generating sensors and generates a record of a sum of total pulses.

39. The method of claim 38 further comprising detecting said low pressure condition based on said record.

40. The method of claim 38 further comprising comparing said record to a previous record to determine whether said record is valid.

41. The method of claim 38 wherein said control module determines a pulse ratio for each of said tires based on said pulse signals and said low pressure condition is detected based on said pulse ratios.

42. The method of claim 32 wherein said first and second distances each comprise a distance record that is compared to a criteria to determine whether said distance record is valid.

43. A method of detecting a low pressure condition in one of a plurality of tires of a vehicle, comprising:
generating rotation signals based on a rotation of each of said tires;
generating a pressure signal based on a pressure within one of said tires;
initiating a primary characterization routine based on said pressure signal to define a tire pressure monitoring baseline;
initiating a secondary characterization routine upon completion of said primary characterization routine to further define said baseline; and
detecting said low pressure condition of at least one of said tires based on said baseline and said pulse signals
determining a first distance one of said tires has traveled based on said pulse signal associated with said one of said tires;
determining a second distance another of said tires has traveled based on said pulse signal associated with said another of said tires; and
detecting said low pressure condition based on said first distance and said second distance, and;
operating a signal to advise of said low pressure condition.

44. The method of claim 43 further comprising determining a location of said pressure sensor based on a change in said pressure signal and a rotation of one of said tires within a threshold time after said change in said pressure signal occurs.

45. The method of claim 43 wherein said step of initiating said characterization routine occurs when said pressure signal indicates a pressure change that exceeds a threshold pressure change within a threshold time.

46. The method of claim 43 wherein further comprising detecting said low pressure condition of at least one of said tires based on said pressure signal.

47. The method of claim 43 further comprising accumulating individual pulse sums from each of said pulse generating sensors and generates a record of a sum of total pulses.

48. The method of claim 47 further comprising detecting said low pressure condition based on said record.

49. The method of claim 47 further comprising comparing said record to a previous record to determine whether said record is valid.

50. The method of claim 43 wherein said first and second distances each comprise a distance record that is compared to a criteria to determine whether said distance record is valid.

51. The method of claim 43 wherein said control module determines a pulse ratio for each of said tires based on said pulse signals and said low pressure condition is detected based on said pulse ratios.

52. A tire pressure monitoring system for a vehicle having a plurality of inflatable tires, comprising:
a plurality of pulse generating sensors that generate pulse signals based on a rotation of each of said tires;
a pressure sensor that is responsive to a pressure within one of said tires and generates a pressure signal based on said pressure; and
a control module that receives said pulse signals and said pressure signal, that executes a primary characterization routine to define a first baseline based on said pulse signals and said pressure signal, that executes a secondary characterization routine upon completion of said primary characterization routine to define a second baseline based on said pulse signals and that detects a low pressure condition of at least one of said tires based on one of said first and second baselines and said pulse signals.

53. The tire pressure monitoring system of claim 52 wherein said control module detects said low pressure condition based on said first baseline prior to completion of said secondary characterization routine and detects said low pressure condition based on said second baseline upon completion of said secondary characterization routine.

54. The tire pressure monitoring system of claim 52 wherein said control module determines a location of said pressure sensor based on a change in said pressure signal and a rotation of one of said tires within a threshold time after said change in said pressure signal occurs.

55. The tire pressure monitoring system of claim 52 wherein said control module executes said primary characterization routine when said pressure signal indicates a pressure change that exceeds a threshold pressure change within a threshold time.

56. The tire pressure monitoring system of claim 52 wherein said control module detects said low pressure condition of at least one of said tires based on said pressure signal.

57. The tire pressure monitoring system of claim 52 wherein said control module accumulates individual pulse sums from each of said pulse generating sensors and generates a record of a sum of total pulses.

58. The tire pressure monitoring system of claim 57 wherein said control module detects said low pressure condition based on said record.

59. The tire pressure monitoring system of claim 57 wherein said control module compares said record to a previous record to determine whether said record is valid.

60. The tire pressure monitoring system of claim 52 wherein said control module determines a first distance one of said tires has traveled based on said pulse signal associated with said one of said tires, determines a second distance another of said tires has traveled based on said pulse signal associated with said another of said tires and detects said low pressure condition based on said first distance and said second distance.

61. The tire pressure monitoring system of claim 60 wherein said first and second distances each comprise a distance record that is compared to a criteria to determine whether said distance record is valid.

62. The tire pressure monitoring system of claim 52 wherein said control module determines a pulse ratio for each of said tires based on said pulse signals and said low pressure condition is detected based on said pulse ratios.

* * * * *